US008698782B2

(12) United States Patent
Kurokawa

(10) Patent No.: US 8,698,782 B2
(45) Date of Patent: Apr. 15, 2014

(54) METHOD FOR DRIVING SEMICONDUCTOR DEVICE

(75) Inventor: Yoshiyuki Kurokawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 79 days.

(21) Appl. No.: 13/329,408

(22) Filed: Dec. 19, 2011

(65) Prior Publication Data

US 2012/0162167 A1 Jun. 28, 2012

(30) Foreign Application Priority Data

Dec. 22, 2010 (JP) ................................. 2010-285814

(51) Int. Cl.
*G06F 3/042* (2006.01)

(52) U.S. Cl.
USPC ................................ 345/175; 345/76; 345/83

(58) Field of Classification Search
USPC ................................................. 345/173, 175
See application file for complete search history.

(56) References Cited

U.S. PATENT DOCUMENTS

| 6,747,638 | B2 | 6/2004 | Yamazaki et al. |
| 7,271,835 | B2 | 9/2007 | Iizuka et al. |
| 7,525,523 | B2 | 4/2009 | Yamazaki et al. |
| 7,663,165 | B2 | 2/2010 | Mouli |
| 7,674,650 | B2 | 3/2010 | Akimoto et al. |
| 2004/0189567 | A1* | 9/2004 | Kimura ........................... 345/87 |
| 2006/0157760 | A1 | 7/2006 | Hayashi et al. |
| 2007/0018075 | A1 | 1/2007 | Cazaux et al. |
| 2008/0024476 | A1* | 1/2008 | Choi et al. ...................... 345/207 |
| 2008/0054319 | A1 | 3/2008 | Mouli |
| 2008/0150848 | A1* | 6/2008 | Chung et al. ...................... 345/82 |
| 2009/0101948 | A1 | 4/2009 | Park et al. |
| 2009/0295769 | A1 | 12/2009 | Yamazaki et al. |
| 2010/0117991 | A1 | 5/2010 | Koyama et al. |

(Continued)

FOREIGN PATENT DOCUMENTS

JP    2010-153834 A    7/2010

OTHER PUBLICATIONS

Toshio Kamiya et al.; "Carrier Transport Properties and Electronic Structures of Amorphous Oxide Semiconductors: The present status"; Solid State Physics, Sep. 1, 2009, pp. 621-633; vol. 44, No. 9; Agne Gijutsu Center; with full English translation.

(Continued)

*Primary Examiner* — Sumati Lefkowitz
*Assistant Examiner* — Robin Mak
(74) *Attorney, Agent, or Firm* — Fish & Richardson P.C.

(57) ABSTRACT

To shorten a period necessary for a plurality of photosensors arranged in a display and data input region to receive light. In a first period, a reset operation is concurrently performed and then a storage operation is concurrently performed in a plurality of first photosensors while a plurality of first light-emitting elements emit light concurrently and a plurality of second light-emitting elements do not emit light. In a second period, the reset operation is concurrently performed and then the storage operation is concurrently performed in a plurality of second photosensors while the plurality of second light-emitting elements emit light concurrently and the plurality of first light-emitting elements do not emit light. In a third period, a selection operation is sequentially performed in the plurality of first photosensors and the selection operation is sequentially performed in the plurality of second photosensors.

17 Claims, 12 Drawing Sheets

(56) References Cited

U.S. PATENT DOCUMENTS

| | | | |
|---|---|---|---|
| 2010/0134735 A1* | 6/2010 | Nakamura et al. | 349/116 |
| 2010/0182282 A1 | 7/2010 | Kurokawa et al. | |
| 2010/0283765 A1* | 11/2010 | Gotoh et al. | 345/175 |
| 2011/0050645 A1* | 3/2011 | Lee et al. | 345/175 |
| 2011/0176038 A1 | 7/2011 | Kurokawa et al. | |
| 2011/0204371 A1 | 8/2011 | Kozuma et al. | |
| 2011/0220889 A1 | 9/2011 | Kurokawa et al. | |
| 2011/0221723 A1 | 9/2011 | Kurokawa et al. | |
| 2011/0221724 A1 | 9/2011 | Kurokawa et al. | |
| 2011/0221945 A1 | 9/2011 | Kurokawa et al. | |

OTHER PUBLICATIONS

Kohei Tanaka et al.; "45.5: A System LCD with Optical Input Function using Infra-Red Backlight Subtraction Scheme"; SID Digest '10 : SID International Symposium Digest of Technical Papers; 2010; pp. 680-683.

Sanghun Jeon et al.; "180nm Gate Length Amorphous InGaZnO Thin Film Transistor for High Density Image Sensor Applications"; IEDM 10: Technical Digest of International Electron Devices Meeting; Dec. 6, 2010; pp. 504-507.

* cited by examiner

FIG. 2

| | | TL1 | TL2 | TL3 | TL4 | TL5 | TL6 |
|---|---|---|---|---|---|---|---|
| (p,q) | 101R | R | | | | | |
| | 101G | | | G | | | |
| | 101B | | | | | B | |
| | 301R | TR+TI | | | | | |
| | 301G | | | TR+TI | | | |
| | 301B | | | | | TR+TI | |
| (p+1,q) | 101R | R | | | | | |
| | 101G | | | G | | | |
| | 101B | | | | | B | |
| | 301R | TR+TI | | | | | |
| | 301G | | | TR+TI | | | |
| | 301B | | | | | TR+TI | |
| (p+2,q) | 101R | R | | | | | |
| | 101G | | | G | | | |
| | 101B | | | | | B | |
| | 301R | TR+TI | | | | | |
| | 301G | | | TR+TI | | | |
| | 301B | | | | | TR+TI | |
| (p+3,q) | 101R | R | | | | | |
| | 101G | | | G | | | |
| | 101B | | | | | B | |
| | 301R | TR+TI | | | | | |
| | 301G | | | TR+TI | | | |
| | 301B | | | | | TR+TI | |
| (p+4,q) | 101R | R | | | | | |
| | 101G | | | G | | | |
| | 101B | | | | | B | |
| | 301R | TR+TI | | | | | |
| | 301G | | | TR+TI | | | |
| | 301B | | | | | TR+TI | |
| (p+5,q) | 101R | R | | | | | |
| | 101G | | | G | | | |
| | 101B | | | | | B | |
| | 301R | TR+TI | | | | | |
| | 301G | | | TR+TI | | | |
| | 301B | | | | | TR+TI | |

FIG. 11

| | | (p,q) | | | (p+1,q) | | | (p+2,q) | | | (p+3,q) | | | (p+4,q) | | | (p+5,q) | | |
|---|---|---|---|---|---|---|---|---|---|---|---|---|---|---|---|---|---|---|---|
| | | 301R | 301G | 301B | 301R | 301G | 301B | 301R | 301G | 301B | 301R | 301G | 301B | 301R | 301G | 301B | 301R | 301G | 301B |

FIG. 12

| (p,q)   | 301R | TS |    |    |    |    |    |    |
|---------|------|----|----|----|----|----|----|----|
| (p+1,q) | 301G |    |    |    | TS |    |    |    |
| (p+2,q) | 301B |    |    |    |    |    |    | TS |
| (p+3,q) | 301R |    | TS |    |    |    |    |    |
| (p+4,q) | 301G |    |    |    |    | TS |    |    |
| (p+5,q) | 301B |    |    |    |    |    |    | TS |

METHOD FOR DRIVING SEMICONDUCTOR DEVICE

BACKGROUND OF THE INVENTION

1. Field of the Invention

The present invention relates to semiconductor devices including photosensors. The present invention relates to a semiconductor device including a photosensor and a display element, and more particularly to a semiconductor device including a light-emitting element as a display element. In addition, the present invention relates to a method for driving a semiconductor device and an electronic device including a semiconductor device.

2. Description of the Related Art

An example of a semiconductor device including a matrix of a plurality of sensors that detect light (also referred to as photosensors) is a solid-state imaging device (also referred to as an image sensor) used in electronic devices such as digital still cameras and mobile phones.

In particular, a semiconductor device including a matrix of a plurality of combinations of photosensors and display elements has an image display function in addition to an image capture function, and is called a touch panel, a touchscreen, or the like (hereinafter referred to as a touch panel). In a touch panel, a region where combinations of photosensors and display elements are arranged in matrix serves as a region for displaying images and inputting data (hereinafter referred to as a display and data input region).

There is suggested a touch panel that uses a display element including an organic light-emitting element as a display element and has a display and data input region where combinations of photosensors and display elements including organic light-emitting elements are arranged in matrix (see FIG. 8 and FIG. 9 in Patent Document 1).

In the touch panel including display elements including light-emitting elements as the display elements, the light-emitting elements arranged in matrix are made to emit light first. When an object exists, the light is blocked by the object and partly reflected. The photosensors arranged in matrix detect the amount of light reflected from the object. In such a manner, the touch panel captures an image of the object and detects a region where the object exists.

With the method for driving the touch panel disclosed in Patent Document 1, a plurality of photosensors sequentially obtain data on an object (hereinafter also referred to as object data) corresponding to red row by row in a period during which the light-emitting elements emit red light; the plurality of photosensors sequentially obtain object data corresponding to green row by row in a period during which the light-emitting elements emit green light; and the plurality of photosensors sequentially obtain object data corresponding to blue row by row in a period during which the light-emitting elements emit blue light. In such a manner, a color image corresponding to the object is obtained (see FIG. 10 in Patent Document 1).

REFERENCE

Patent Document 1: Japanese Published Patent Application No. 2010-153834

SUMMARY OF THE INVENTION

In order to obtain a color image corresponding to an object, it is necessary to provide a period during which a plurality of photosensors arranged in a display and data input region receive light (e.g., light reflected from the object). In this period, light-emitting elements that are selected to emit light among the plurality of light-emitting elements arranged in the display and data input region are made to emit light with the same (or substantially the same) luminance in order to obtain object data. Therefore, normal image display cannot be performed in this period.

In view of the above, an object is to shorten a period necessary for a plurality of photosensors arranged in a display and data input region to receive light (e.g., light reflected from an object to be detected). In other words, an object is to provide a semiconductor device that includes a matrix of a plurality of combinations of photosensors and display elements including light-emitting elements and can obtain a color image corresponding to an object with less influence on normal image display, and to provide a method for driving the semiconductor device.

<Method of Driving Semiconductor Device for Obtaining Object Data Corresponding to at Least Two Different Hues>

Embodiments of a method for driving a semiconductor device in the present invention will be described. First, the structure of a semiconductor device to which the driving method is applied is described.

<Basic Structure of Semiconductor Device>

The semiconductor device includes a plurality of first display elements that are arranged in matrix and each includes a first light-emitting element emitting light of a first hue; a plurality of second display elements that are arranged in matrix and each include a second light-emitting element emitting light of a second hue different from the first hue; a plurality of first photosensors that are arranged in matrix and receive light of the first hue; and a plurality of second photosensors that are arranged in matrix and receive light of the second hue. The first photosensors each include a first photoelectric conversion element receiving light of the first hue, and a first amplifier circuit electrically connected to the first photoelectric conversion element. The second photosensors each include a second photoelectric conversion element receiving light of the second hue, and a second amplifier circuit electrically connected to the second photoelectric conversion element.

One embodiment of the method for driving a semiconductor device in the present invention is the following driving method for the above semiconductor device.

The first amplifier circuit performs a reset operation of discharging charge stored in the first amplifier circuit, a storage operation of storing charge corresponding to the amount of photocurrent flowing through the first photoelectric conversion element, and a selection operation of reading an output signal including the amount of the charge as data. The second amplifier circuit performs a reset operation of discharging charge stored in the second amplifier circuit, a storage operation of storing charge corresponding to the amount of photocurrent flowing through the second photoelectric conversion element, and a selection operation of reading an output signal including the amount of the charge as data.

In a first period, the reset operation is concurrently performed and then the storage operation is concurrently performed in the plurality of first photosensors while the plurality of first light-emitting elements emit light concurrently and the plurality of second light-emitting elements do not emit light. In a second period that does not overlap the first period, the reset operation is concurrently performed and then the storage operation is concurrently performed in the plurality of second photosensors while the plurality of second light-emitting elements emit light concurrently and the plurality of first light-emitting elements do not emit light. In a third period after the first period and the second period, the selection operation is sequentially performed in the plurality of first photosensors and the selection operation is sequentially performed in the plurality of second photosensors.

Here, in the first period, the plurality of first light-emitting elements emit light with the same (or substantially the same) luminance. In the second period, the plurality of second light-emitting elements emit light with the same (or substantially the same) luminance.

In such a manner, object data corresponding to the first hue and object data corresponding to the second hue are obtained; thus, a color image corresponding to the object can be obtained.

<Variations of Structure of Semiconductor Device>

Note that the above semiconductor device can be regarded as a semiconductor device that includes a matrix of a plurality of combinations of at least one display element and at least one photosensor. The following Structure 1 corresponds to the case where the semiconductor device includes a matrix of combinations of a first display element, a second display element, a first photosensor, and a second photosensor. The following Structure 2 corresponds to the case where the semiconductor device includes a matrix of groups including a first combination (a first display element, a second display element, and a first photosensor) and a second combination (a third display element, a fourth display element, and a second photosensor).

<Structure 1 of Semiconductor Device>

The semiconductor device includes a matrix of a plurality of combinations of a first display element, a second display element, a first photosensor, and a second photosensor. The first display element includes a first light-emitting element emitting light of a first hue. The second display element includes a second light-emitting element emitting light of a second hue different from the first hue. The first photosensor includes a first photoelectric conversion element receiving light of the first hue, and a first amplifier circuit electrically connected to the first photoelectric conversion element. The second photosensor includes a second photoelectric conversion element receiving light of the second hue, and a second amplifier circuit electrically connected to the second photoelectric conversion element.

One embodiment of the method for driving the semiconductor device in the present invention is the following driving method for the semiconductor device with the above Structure 1.

The first amplifier circuit performs a reset operation of discharging charge stored in the first amplifier circuit, a storage operation of storing charge corresponding to the amount of photocurrent flowing through the first photoelectric conversion element, and a selection operation of reading an output signal including the amount of the charge as data. The second amplifier circuit performs a reset operation of discharging charge stored in the second amplifier circuit, a storage operation of storing charge corresponding to the amount of photocurrent flowing through the second photoelectric conversion element, and a selection operation of reading an output signal including the amount of the charge as data.

In a first period, the reset operation is concurrently performed and then the storage operation is concurrently performed in the plurality of first photosensors while the plurality of first light-emitting elements emit light concurrently and the plurality of second light-emitting elements do not emit light. In a second period that does not overlap the first period, the reset operation is concurrently performed and then the storage operation is concurrently performed in the plurality of second photosensors while the plurality of second light-emitting elements emit light concurrently and the plurality of first light-emitting elements do not emit light. In a third period after the first period and the second period, the selection operation is sequentially performed in the plurality of first photosensors and the selection operation is sequentially performed in the plurality of second photosensors.

Here, in the first period, the plurality of first light-emitting elements emit light with the same (or substantially the same) luminance. In the second period, the plurality of second light-emitting elements emit light with the same (or substantially the same) luminance.

In such a manner, object data corresponding to the first hue and object data corresponding to the second hue are obtained; thus, a color image corresponding to the object can be obtained.

<Structure 2 of Semiconductor Device>

The semiconductor device includes a matrix of a plurality of groups each including a first combination (a first display element, a second display element, and a first photosensor) and a second combination (a third display element, a fourth display element, and a second photosensor). The first display element includes a first light-emitting element emitting light of a first hue. The second display element includes a second light-emitting element emitting light of a second hue different from the first hue. The third display element includes a third light-emitting element emitting light of the first hue. The fourth display element includes a fourth light-emitting element emitting light of the second hue. The first photosensor includes a first photoelectric conversion element receiving light of the first hue, and a first amplifier circuit electrically connected to the first photoelectric conversion element. The second photosensor includes a second photoelectric conversion element receiving light of the second hue, and a second amplifier circuit electrically connected to the second photoelectric conversion element.

One embodiment of the method for driving the semiconductor device in the present invention is the following driving method for the semiconductor device with the above Structure 2.

The first amplifier circuit performs a reset operation of discharging charge stored in the first amplifier circuit, a storage operation of storing charge corresponding to the amount of photocurrent flowing through the first photoelectric conversion element, and a selection operation of reading an output signal including the amount of the charge as data. The second amplifier circuit performs a reset operation of discharging charge stored in the second amplifier circuit, a storage operation of storing charge corresponding to the amount of photocurrent flowing through the second photoelectric conversion element, and a selection operation of reading an output signal including the amount of the charge as data.

In a first period, the reset operation is concurrently performed and then the storage operation is concurrently performed in the plurality of first photosensors while the pluralities of first light-emitting elements and third light-emitting elements emit light concurrently and the pluralities of second light-emitting elements and fourth light-emitting elements do not emit light. In a second period that does not overlap the first period, the reset operation is concurrently performed and then the storage operation is concurrently performed in the plurality of second photosensors while the pluralities of second light-emitting elements and fourth light-emitting elements emit light concurrently and the pluralities of first light-emitting elements and third light-emitting elements do not emit light. In a third period after the first period and the second period, the selection operation is sequentially performed in the plurality of first photosensors and the selection operation is sequentially performed in the plurality of second photosensors.

Here, in the first period, the pluralities of first light-emitting elements and third light-emitting elements emit light with the same (or substantially the same) luminance. In the second period, the pluralities of second light-emitting elements and fourth light-emitting elements emit light with the same (or substantially the same) luminance.

In such a manner, object data corresponding to the first hue and object data corresponding to the second hue are obtained; thus, a color image corresponding to the object can be obtained.

The above are the embodiments of the method of driving the semiconductor device for obtaining at least object data corresponding to the first hue and object data corresponding to the second hue. The present invention can also be applied to a method of driving a semiconductor device for obtaining object data corresponding to three or more different hues. Examples of a plurality of different hues are, but not limited to, red, green and blue; red, green, blue, and one of yellow, cyan, and magenta; and red, green, blue, and white. Examples in which the present invention is applied to a method of driving a semiconductor device for obtaining object data corresponding to three different hues will be described below.

<Method of Driving Semiconductor Device for Obtaining Object Data Corresponding to Three Different Hues>

<Basic Structure of Semiconductor Device>

The semiconductor device includes a plurality of first display elements that are arranged in matrix and each include a first light-emitting element emitting light of a first hue; a plurality of second display elements that are arranged in matrix and each include a second light-emitting element emitting light of a second hue different from the first hue; a plurality of third display elements that are arranged in matrix and each include a third light-emitting element emitting light of a third hue different from the first hue and the second hue; a plurality of first photosensors that are arranged in matrix and receive light of the first hue; a plurality of second photosensors that are arranged in matrix and receive light of the second hue; and a plurality of third photosensors that are arranged in matrix and receive light of the third hue. The first photosensors each include a first photoelectric conversion element receiving light of the first hue, and a first amplifier circuit electrically connected to the first photoelectric conversion element. The second photosensors each include a second photoelectric conversion element receiving light of the second hue, and a second amplifier circuit electrically connected to the second photoelectric conversion element. The third photosensors each include a third photoelectric conversion element receiving light of the third hue, and a third amplifier circuit electrically connected to the third photoelectric conversion element.

One embodiment of the method for driving a semiconductor device in the present invention is the following driving method for the above semiconductor device.

The first amplifier circuit performs a reset operation of discharging charge stored in the first amplifier circuit, a storage operation of storing charge corresponding to the amount of photocurrent flowing through the first photoelectric conversion element, and a selection operation of reading an output signal including the amount of the charge as data. The second amplifier circuit performs a reset operation of discharging charge stored in the second amplifier circuit, a storage operation of storing charge corresponding to the amount of photocurrent flowing through the second photoelectric conversion element, and a selection operation of reading an output signal including the amount of the charge as data. The third amplifier circuit performs a reset operation of discharging charge stored in the third amplifier circuit, a storage operation of storing charge corresponding to the amount of photocurrent flowing through the third photoelectric conversion element, and a selection operation of reading an output signal including the amount of the charge as data.

In a first period, the reset operation is concurrently performed and then the storage operation is concurrently performed in the plurality of first photosensors while the plurality of first light-emitting elements emit light concurrently and the plurality of second light-emitting elements and third light-emitting elements do not emit light. In a second period that does not overlap the first period, the reset operation is concurrently performed and then the storage operation is concurrently performed in the plurality of second photosensors while the plurality of second light-emitting elements emit light concurrently and the plurality of first light-emitting elements and third light-emitting elements do not emit light. In a third period that does not overlap the first period and the second period, the reset operation is concurrently performed and then the storage operation is concurrently performed in the plurality of third photosensors while the plurality of third light-emitting elements emit light concurrently and the plurality of first light-emitting elements and second light-emitting elements do not emit light. In a fourth period after the first period, the second period, and the third period, the selection operation is sequentially performed in the plurality of first photosensors, the selection operation is sequentially performed in the plurality of second photosensors, and the selection operation is sequentially performed in the plurality of third photosensors.

Here, in the first period, the plurality of first light-emitting elements emit light with the same (or substantially the same) luminance. In the second period, the plurality of second light-emitting elements emit light with the same (or substantially the same) luminance. In the third period, the plurality of third light-emitting elements emit light with the same (or substantially the same) luminance.

In such a manner, object data corresponding to the first hue, object data corresponding to the second hue, and object data corresponding to the third hue are obtained; thus, a color image corresponding to the object can be obtained.

<Variations of Structure of Semiconductor Device>

Note that the above semiconductor device can be regarded as a semiconductor device that includes a plurality of combinations of at least one display element and at least one photosensor. The following Structure 1 corresponds to the case where the semiconductor device includes a matrix of combinations of a first display element, a second display element, a third display element, a first photosensor, a second photosensor, and a third photosensor. The following Structure 2 corresponds to the case where the semiconductor device includes a matrix of groups including a first combination (a first display element, a second display element, a third display element, and a first photosensor), a second combination (a fourth display element, a fifth display element, a sixth display element, and a second photosensor), and a third combination (a seventh display element, an eighth display element, a ninth display element, and a third photosensor).

<Structure 1 of Semiconductor Device>

The semiconductor device includes a matrix of a plurality of combinations of a first display element, a second display element, a third display element, a first photosensor, a second photosensor, and a third photosensor. The first display element includes a first light-emitting element emitting light of a first hue. The second display element includes a second light-emitting element emitting light of a second hue different from the first hue. The third display element includes a third light-emitting element emitting light of a third hue different from the first hue and the second hue. The first photosensor includes a first photoelectric conversion element receiving light of the first hue, and a first amplifier circuit electrically connected to the first photoelectric conversion element. The second photosensor includes a second photoelectric conversion element receiving light of the second hue, and a second amplifier circuit electrically connected to the second photoelectric conversion element. The third photosensor includes a third photoelectric conversion element receiving light of the third hue, and a third amplifier circuit electrically connected to the third photoelectric conversion element.

One embodiment of the method for driving the semiconductor device in the present invention is the following driving method for the semiconductor device with the above Structure 1.

The first amplifier circuit performs a reset operation of discharging charge stored in the first amplifier circuit, a storage operation of storing charge corresponding to the amount of photocurrent flowing through the first photoelectric conversion element, and a selection operation of reading an output signal including the amount of the charge as data. The second amplifier circuit performs a reset operation of discharging charge stored in the second amplifier circuit, a storage operation of storing charge corresponding to the amount of photocurrent flowing through the second photoelectric conversion element, and a selection operation of reading an output signal including the amount of the charge as data. The third amplifier circuit performs a reset operation of discharging charge stored in the third amplifier circuit, a storage operation of storing charge corresponding to the amount of photocurrent flowing through the third photoelectric conversion element, and a selection operation of reading an output signal including the amount of the charge as data.

In a first period, the reset operation is concurrently performed and then the storage operation is concurrently performed in the plurality of first photosensors while the plurality of first light-emitting elements emit light concurrently and the plurality of second light-emitting elements and third light-emitting elements do not emit light. In a second period that does not overlap the first period, the reset operation is concurrently performed and then the storage operation is concurrently performed in the plurality of second photosensors while the plurality of second light-emitting elements emit light concurrently and the plurality of first light-emitting elements and third light-emitting elements do not emit light. In a third period that does not overlap the first period and the second period, the reset operation is concurrently performed and then the storage operation is concurrently performed in the plurality of third photosensors while the plurality of third light-emitting elements emit light concurrently and the plurality of first light-emitting elements and second light-emitting elements do not emit light. In a fourth period after the first period, the second period, and the third period, the selection operation is sequentially performed in the plurality of first photosensors, the selection operation is sequentially performed in the plurality of second photosensors, and the selection operation is sequentially performed in the plurality of third photosensors.

Here, in the first period, the plurality of first light-emitting elements emit light with the same (or substantially the same) luminance. In the second period, the plurality of second light-emitting elements emit light with the same (or substantially the same) luminance. In the third period, the plurality of third light-emitting elements emit light with the same (or substantially the same) luminance.

In such a manner, object data corresponding to the first hue, object data corresponding to the second hue, and object data corresponding to the third hue are obtained; thus, a color image corresponding to the object can be obtained.

<Structure 2 of Semiconductor Device>

The semiconductor device includes a matrix of a plurality of groups each including a first combination (a first display element, a second display element, a third display element, and a first photosensor), a second combination (a fourth display element, a fifth display element, a sixth display element, and a second photosensor), and a third combination (a seventh display element, an eighth display element, a ninth display element, and a third photosensor). The first display element includes a first light-emitting element emitting light of a first hue. The second display element includes a second light-emitting element emitting light of a second hue different from the first hue. The third display element includes a third light-emitting element emitting light of a third hue different from the first hue and the second hue. The fourth display element includes a fourth light-emitting element emitting light of the first hue. The fifth display element includes a fifth light-emitting element emitting light of the second hue. The sixth display element includes a sixth light-emitting element emitting light of the third hue. The seventh display element includes a seventh light-emitting element emitting light of the first hue. The eighth display element includes an eighth light-emitting element emitting light of the second hue. The ninth display element includes a ninth light-emitting element emitting light of the third hue. The first photosensor includes a first photoelectric conversion element receiving light of the first hue, and a first amplifier circuit electrically connected to the first photoelectric conversion element. The second photosensor includes a second photoelectric conversion element receiving light of the second hue, and a second amplifier circuit electrically connected to the second photoelectric conversion element. The third photosensor includes a third photoelectric conversion element receiving light of the third hue, and a third amplifier circuit electrically connected to the third photoelectric conversion element.

One embodiment of the method for driving the semiconductor device in the present invention is the following driving method for the semiconductor device with the above Structure 2.

The first amplifier circuit performs a reset operation of discharging charge stored in the first amplifier circuit, a storage operation of storing charge corresponding to the amount of photocurrent flowing through the first photoelectric conversion element, and a selection operation of reading an output signal including the amount of the charge as data. The second amplifier circuit performs a reset operation of discharging charge stored in the second amplifier circuit, a storage operation of storing charge corresponding to the amount of photocurrent flowing through the second photoelectric conversion element, and a selection operation of reading an output signal including the amount of the charge as data. The third amplifier circuit performs a reset operation of discharging charge stored in the third amplifier circuit, a storage operation of storing charge corresponding to the amount of photocurrent flowing through the third photoelectric conversion element, and a selection operation of reading an output signal including the amount of the charge as data.

In a first period, the reset operation is concurrently performed and then the storage operation is concurrently performed in the plurality of first photosensors while the pluralities of first, fourth, and seventh light-emitting elements emit light concurrently and the pluralities of second, third, fifth, sixth, eighth, and ninth light-emitting elements do not emit light. In a second period that does not overlap the first period, the reset operation is concurrently performed and then the storage operation is concurrently performed in the plurality of second photosensors while the pluralities of second, fifth, and eighth light-emitting elements emit light concurrently and the pluralities of first, third, fourth, sixth, seventh, and ninth light-emitting elements do not emit light. In a third period that does not overlap the first period and the second period, the reset operation is concurrently performed and then the storage operation is concurrently performed in the plurality of third photosensors while the pluralities of third, sixth, and ninth light-emitting elements emit light concurrently and the pluralities of first, second, fourth, fifth, seventh, and eighth light-emitting elements do not emit light. In a fourth period after the first period, the second period, and the third period, the selection operation is sequentially performed in the plurality of first photosensors, the selection operation is sequentially performed in the plurality of second photosensors, and the selection operation is sequentially performed in the plurality of third photosensors.

Here, in the first period, the pluralities of first, fourth, and seventh light-emitting elements emit light with the same (or substantially the same) luminance. In the second period, the pluralities of second, fifth, and eighth light-emitting elements emit light with the same (or substantially the same) luminance. In the third period, the pluralities of third, sixth, and ninth light-emitting elements emit light with the same (or substantially the same) luminance.

In such a manner, object data corresponding to the first hue, object data corresponding to the second hue, and object data corresponding to the third hue are obtained; thus, a color image corresponding to the object can be obtained.

In any of the above driving methods, it is possible to perform the reset operation regardless of the state (a light-emitting state or a non-light-emitting state) of the light-emitting element included in the semiconductor device. Note that in the photosensor, the reset operation is preferably performed immediately prior to the storage operation.

The light-emitting elements (the first to ninth light-emitting elements) are each an element whose luminance is controlled by current or voltage, and can be a light-emitting diode, an organic light-emitting diode (OLED), or the like.

The photoelectric conversion elements (the first to third photoelectric conversion elements) can each be a photodiode or a phototransistor.

In the method for driving a semiconductor device according to one embodiment of the present invention, the storage operation is concurrently performed in a plurality of photosensors corresponding to one hue, so that light reception for obtaining object data corresponding to each hue can be rapidly performed.

Further, the selection operation in a plurality of photosensors can be performed regardless of the state (a light-emitting state or a non-light-emitting state) of the light-emitting elements included in the semiconductor device. As a result, the selection operation can be performed in the plurality of photosensors while the semiconductor device displays images. Therefore, image display is not much affected even if a period necessary to perform the selection operation in all the plurality of photosensors is long.

When the above driving method is employed, a plurality of photosensors included in the semiconductor device have different lengths of the period after the end of the reset operation and the storage operation and before the start of the selection operation. If leakage is large in elements included in the photosensor, as the period is longer, noise included in obtained data is increased and it becomes more difficult to obtain object data correctly in a plurality of photosensors. Here, when a transistor is used as an element included in the photosensor and the transistor is in particular a transistor whose channel is formed in an oxide semiconductor layer, leakage due to the off-state current of the transistor can be reduced. Thus, the influence of noise can be reduced even if the period after the end of the reset operation and the storage operation and before the start of the selection operation is long. Accordingly, object data can be correctly obtained by employing the above driving method.

Thus, it is possible to provide a semiconductor device that can obtain a color image corresponding to an object with less influence on normal image display, and a method for driving the semiconductor device.

BRIEF DESCRIPTION OF THE DRAWINGS

In the accompanying drawings:

FIG. 2 is a timing chart illustrating the operation of a semiconductor device;

FIG. 11 is a timing chart illustrating the operation of a semiconductor device; and FIG. 12 is a timing chart illustrating the operation of a semiconductor device.

DETAILED DESCRIPTION OF THE INVENTION

Figure 1A:
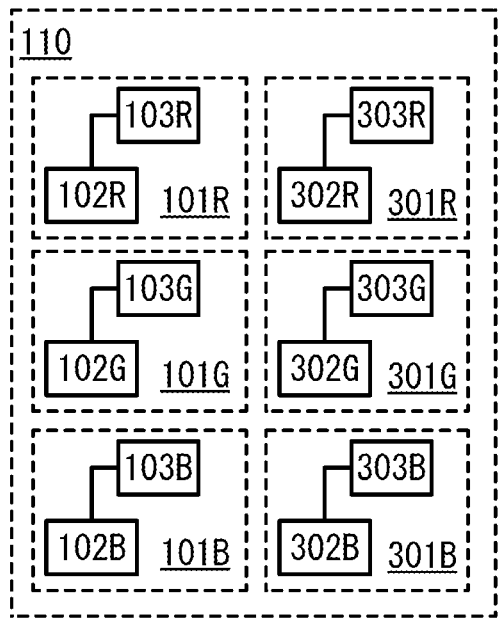
FIG. 1A illustrates a configuration of a combination of photosensors and display elements including light-emitting elements.

Embodiments of the present invention will be described in detail with reference to the accompanying drawings. Note that the present invention is not limited to the following description, and it is easily understood by those skilled in the art that various changes and modifications can be made without departing from the spirit and scope of the present invention. Therefore, the present invention should not be limited to the descriptions of the embodiments.

Note that the "source electrode" and "drain electrode" of a transistor interchange with each other depending on the polarity of the transistor or the levels of potentials applied to the electrodes. In general, in an n-channel transistor, an electrode supplied with a lower potential is called a source electrode, and an electrode supplied with a higher potential is called a drain electrode. Further, in a p-channel transistor, an electrode supplied with a lower potential is called a drain electrode, and an electrode supplied with a higher potential is called a source electrode. In the description below, one of a source electrode and a drain electrode is referred to as a first terminal and the other thereof is referred to as a second terminal in some cases.

Note that "electrical connection" in this specification corresponds to the state where current, voltage, or a potential can be supplied or transmitted. Therefore, a state of electrical connection means not only a state of direct connection but also a state of indirect connection through a circuit element such as a wiring, a resistor, a diode, or a transistor, in which current, voltage, or a potential can be supplied or transmitted.

Even when a circuit diagram illustrates independent components that are connected to each other, there is a case where one conductive film has functions of a plurality of components, such as the case where part of a wiring functions as an electrode.

In this specification, a state in which transistors are electrically connected in series with each other means, for example, a state in which only one of a first terminal and a second terminal of one transistor is electrically connected to only one of a first terminal and a second terminal of another transistor. Further, a state in which transistors are electrically connected in parallel with each other means a state in which a first terminal of one transistor is electrically connected to a first terminal of another transistor and a second terminal of one transistor is electrically connected to a second terminal of another transistor.

Unless otherwise specified, in the case of an n-channel transistor, the off-state current in this specification is a current that flows between a source electrode and a drain electrode when the potential of a gate electrode is less than or equal to 0 V with the potential of the source electrode as a reference potential while the potential of the drain electrode is higher than those of the source electrode and the gate electrode. Moreover, in the case of a p-channel transistor, the off-state current in this specification is a current that flows between a source electrode and a drain electrode when the potential of a gate electrode is greater than or equal to 0 V with the potential of the source electrode as a reference potential while the potential of the drain electrode is lower than those of the source electrode and the gate electrode.

Embodiment 1

In this embodiment, a method for driving a semiconductor device according to one embodiment of the present invention will be described.

<One Embodiment of Structure of Semiconductor Device>

Figure 1B:
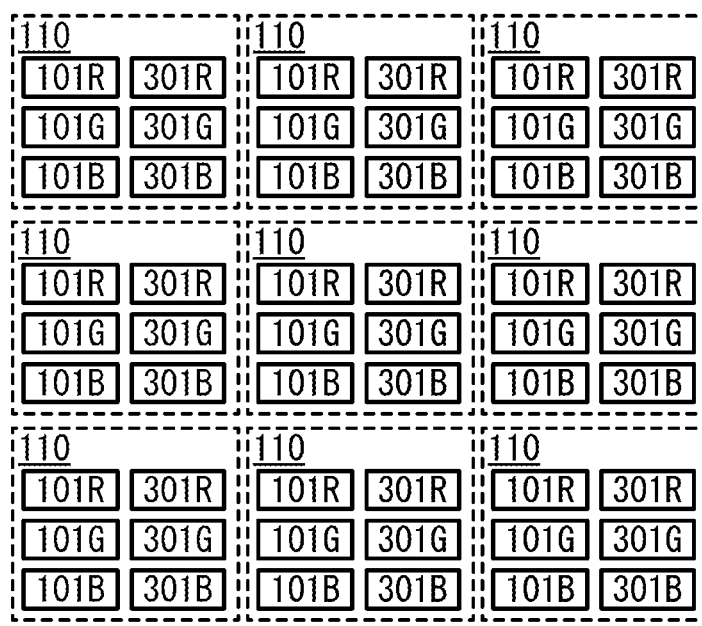
FIG. 1B illustrates a configuration of a plurality of combinations arranged in matrix.

First, the structure of the semiconductor device will be described with reference to FIGS. 1A and 1B. FIG. 1A is a schematic diagram of the configuration of part of a display and data input region in the semiconductor device. In FIG. 1A, a combination 110 includes a display element 101R, a display element 101G, a display element 101B, a photosensor 301R, a photosensor 301G, and a photosensor 301B. In addition, as illustrated in FIG. 1B, the display and data input region in the semiconductor device includes a plurality of combinations 110 arranged in matrix. Note that FIG. 1B shows an example where the combinations 110 of three rows and three columns are provided; however, this is not a limiting example. In general, a plurality of combinations 110 can be arranged in a matrix of m rows and n columns (m and n are each a natural number).

In FIGS. 1A and 1B, the display element 101R includes a light-emitting element 102R that emits light of a first hue (e.g., red) and a control circuit 103R that controls the light-emitting element 102R. The display element 101G includes a light-emitting element 102G that emits light of a second hue (e.g., green) different from the first hue, and a control circuit 103G that controls the light-emitting element 102G. The display element 101B includes a light-emitting element 102B that emits light of a third hue (e.g., blue) different from the first hue and the second hue, and a control circuit 103B that controls the light-emitting element 102B. The photosensor 301R includes a photoelectric conversion element 302R that receives light of the first hue and an amplifier circuit 303R that is electrically connected to the photoelectric conversion element 302R. The photosensor 301G includes a photoelectric conversion element 302G that receives light of the second hue and an amplifier circuit 303G that is electrically connected to the photoelectric conversion element 302G. The photosensor 301B includes a photoelectric conversion element 302B that receives light of the third hue and an amplifier circuit 303B that is electrically connected to the photoelectric conversion element 302B.

As illustrated in FIG. 1B, in the plurality of combinations 110 arranged in one column, the display elements 101R, the display elements 101G, and the display elements 101B can be arranged in one direction. The one direction can be the column direction of the combinations 110 arranged in matrix (the direction in which the combinations 110 in the same column are disposed). Further, in the plurality of combinations 110 arranged in one column, the photosensors 301R, the photosensors 301G, and the photosensors 301B can be arranged in one direction. The one direction can be the column direction of the combinations 110 arranged in matrix (the direction in which the combinations 110 in the same column are disposed). Here, it can be said that a "column" (hereinafter referred to as a pixel sub-column) of the display elements corresponding to different hues and a "column" (hereinafter referred to as a sensor sub-column) of the photosensors corresponding to different hues constitute one column of the combinations 110.

Here, the photosensors corresponding to the same hue can be arranged in one direction as illustrated in FIG. 1B. The one direction can be the row direction of the combinations 110 arranged in matrix (the direction in which the combinations 110 in the same row are disposed). In the configuration in FIG. 1B, a "row" (hereinafter referred to as a sensor sub-row) of the photosensors 301R, a "row" (a sensor sub-row) of the photosensors 301G, and a "row" (a sensor sub-row) of the photosensors 301B, that is, three sensor sub-rows correspond to one row of the combinations 110. In other words, in one given sensor sub-row of a plurality of photosensors, the plurality of photosensors can be photosensors corresponding to the same hue. Moreover, in another sensor sub-row of a plurality of photosensors, the plurality of photosensors can be photosensors corresponding to a hue different from the above hue.

In addition, the display elements corresponding to the same hue can be arranged in one direction. The one direction can be the row direction of the combinations 110 arranged in matrix (the direction in which the combinations 110 in the same row are disposed). In the configuration in FIG. 1B, a "row" (hereinafter referred to as a pixel sub-row) of the display elements 101R, a "row" (a pixel sub-row) of the display elements 101G, and a "row" (a pixel sub-row) of the display elements 101B, that is, three pixel sub-rows correspond to one row of the combinations 110. In other words, in one given pixel sub-row of a plurality of display elements, the plurality of display elements can be display elements corresponding to the same hue. Moreover, in another pixel sub-row of a plurality of display elements, the plurality of display elements can be display elements corresponding to a hue different from the above hue.

FIGS. 1A and 1B illustrate the example in which the combination 110 is composed of photosensors corresponding to three different hues and display elements corresponding to three different hues; however, this is not a limiting example. The number of photosensors included in the combination 110 and the number of corresponding hues can be any number. Further, the number of display elements included in the combination 110 and the number of corresponding hues can be any number.

<One Embodiment of Specific Configuration of Display Element>

Figure 5A:
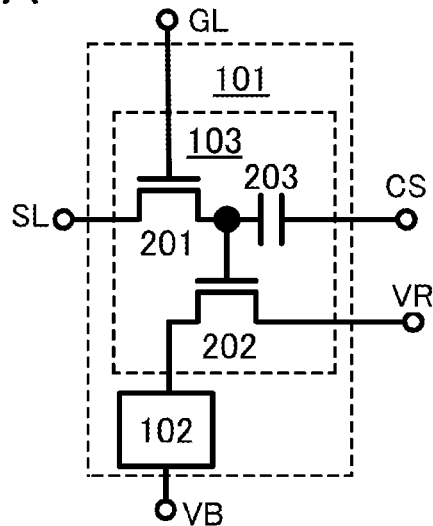
FIGS. 5A to 5C are circuit diagrams each illustrating a configuration of a display element.
Figure 5B:
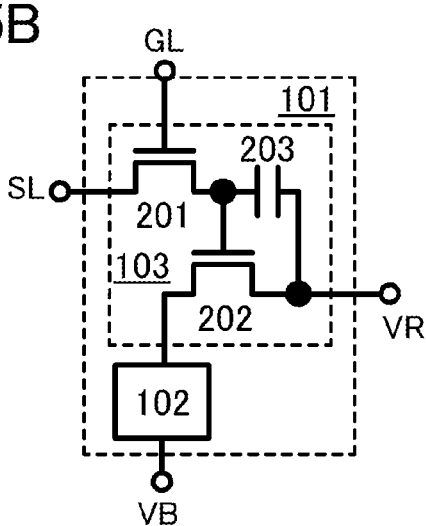
Figure 5C:
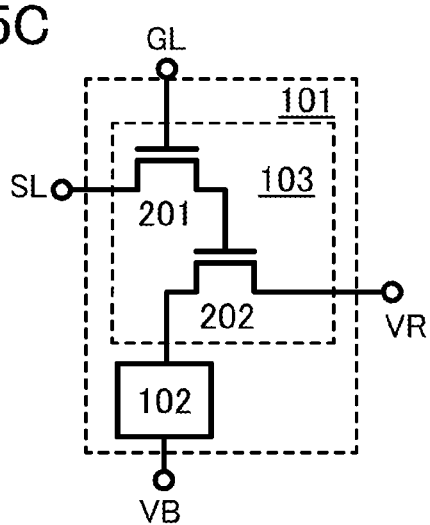

The display element 101R, the display element 101G, and the display element 101B can have any of configurations illustrated in FIGS. 5A to 5C, for example. Note that in FIGS. 5A to 5C, a light-emitting element 102 can be any of the light-emitting elements 102R, 102G, and 102B. Moreover, in FIGS. 5A to 5C, a control circuit 103 can be any of the control circuits 103R, 103G, and 103B.

In FIG. 5A, the control circuit 103 includes a transistor 201 and a transistor 202. A gate of the transistor 201 is electrically connected to a wiring GL. One of a source and a drain of the transistor 201 is electrically connected to a wiring SL. The other of the source and the drain of the transistor 201 is electrically connected to a gate of the transistor 202. One of a source and a drain of the transistor 202 is electrically connected to a wiring VR. The other of the source and the drain of the transistor 202 is electrically connected to one of a pair of electrodes of the light-emitting element 102. The other of the pair of electrodes of the light-emitting element 102 is electrically connected to a wiring VB. The wiring VR is a power supply line.

Note that FIG. 5A illustrates the configuration in which the control circuit 103 includes a capacitor 203; one of a pair of electrodes of the capacitor 203 is electrically connected to the gate of the transistor 202 and the other of the source and the drain of the transistor 201, and the other thereof is electrically connected to a wiring CS. However, the control circuit 103 is not limited to having this configuration. It is possible that the wiring CS is not provided and the other of the pair of electrodes of the capacitor 203 is electrically connected to one of the source and the drain of the transistor 202 (or the wiring VR) as illustrated in FIG. 5B.

Further, it is possible that the capacitor 203 is not provided as illustrated in FIG. 5C. For example, by using a transistor with extremely low off-state current as the transistor 201, the gate potential of the transistor 202 can be held for a long time; therefore, the capacitor 203 serving as a storage capacitor can be omitted. As a transistor with extremely low off-state current, a transistor whose channel is formed in an oxide semiconductor layer can be used. Alternatively, the parasitic capacitance of the transistor 202 and the like can be positively used instead of providing the capacitor 203.

<One Embodiment of Specific Configuration of Photosensor>

The photosensor 301R, the photosensor 301G, and the photosensor 301B can have any of configurations illustrated in FIGS. 6A to 6D, for example. Note that in FIGS. 6A to 6D, a photoelectric conversion element 302 can be any of the photoelectric conversion elements 302R, 302G, and 302B. Moreover, in FIGS. 6A to 6D, an amplifier circuit 303 can be any of the amplifier circuits 303R, 303G, and 303B.

Figure 6A:
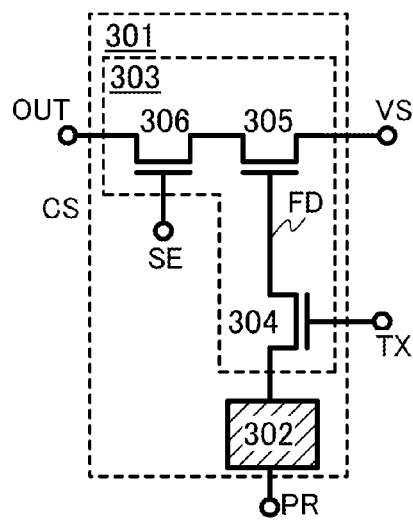
FIGS. 6A to 6D are circuit diagrams each illustrating a configuration of a photosensor.

In FIG. 6A, the amplifier circuit 303 includes a transistor 304, a transistor 305, and a transistor 306. The transistor 305 and the transistor 306 are electrically connected in series between a wiring OUT and a wiring VS. A gate of the transistor 305 is electrically connected to one of a source and a drain of the transistor 304. The other of the source and the drain of the transistor 304 is electrically connected to one of a pair of electrodes of the photoelectric conversion element 302. The other of the pair of electrodes of the photoelectric conversion element 302 is electrically connected to a wiring PR. A gate of the transistor 304 is electrically connected to a wiring TX. A gate of the transistor 306 is electrically connected to a wiring SE. A node where one of the source and the drain of the transistor 304 and the gate of the transistor 305 are electrically connected to each other is referred to as a node FD. The potential of an output signal of the amplifier circuit 303 (a signal output from the wiring OUT) is determined by the amount of charge stored in the node FD. In order to hold charge in the node FD more reliably, a capacitor may be electrically connected to the node FD.

The configuration of the amplifier circuit 303 is not limited to that illustrated in FIG. 6A. For example, the amplifier circuit 303 can have a configuration illustrated in FIG. 6B. The transistor 306 and the transistor 305 are electrically connected in series in this order between the wiring OUT and the wiring VS in FIG. 6A, whereas the transistor 305 and the transistor 306 are electrically connected in series in this order between the wiring OUT and the wiring VS in FIG. 6B.

Figure 6B:
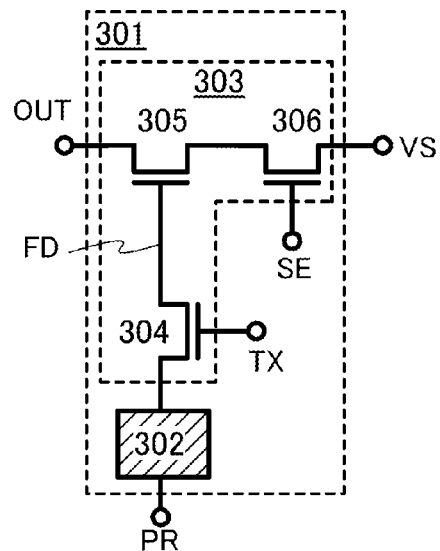
Figure 6C:
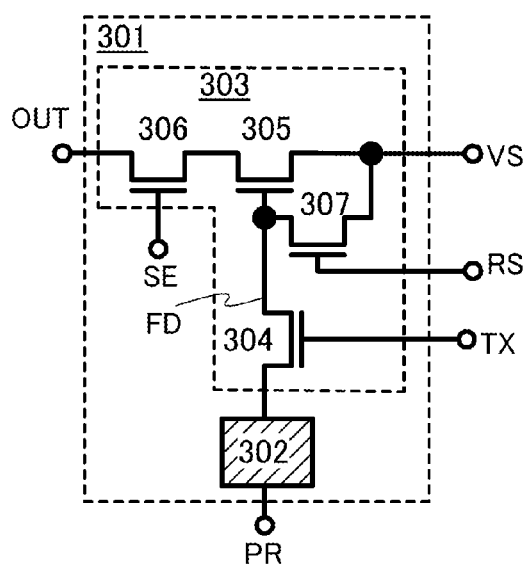
Figure 6D:
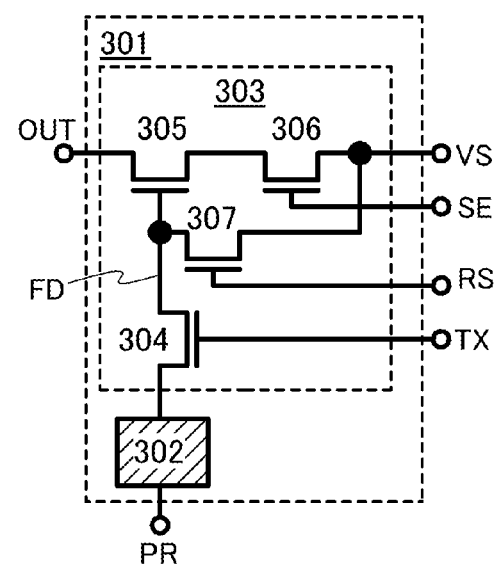

In addition, the amplifier circuit 303 can have any of configurations illustrated in FIGS. 6C and 6D, for example. The amplifier circuit 303 with the configuration in FIG. 6C or FIG. 6D includes a transistor 307 in addition to the components illustrated in FIG. 6A or FIG. 6B. FIG. 6C shows an example in which the transistor 307 is added to the configuration in FIG. 6A. FIG. 6D shows an example in which the transistor 307 is added to the configuration in FIG. 6B. In each of FIGS. 6C and 6D, one of a source and a drain of the transistor 307 is electrically connected to the wiring VS. The other of the source and the drain of the transistor 307 is electrically connected to the gate of the transistor 305 and one of the source and the drain of the transistor 304. A gate of the transistor 307 is electrically connected to a wiring RS.

In one embodiment of the specific configuration of the display element and one embodiment of the specific configuration of the photosensor, at least one of the transistors 201, 202, 304, 305, 306, and 307 can be a transistor whose channel is formed in an oxide semiconductor layer. Alternatively, all the transistors 201, 202, 304, 305, 306, and 307 can be transistors whose channels are formed in oxide semiconductor layers. Further alternatively, at least one of the transistors 201, 202, 304, 305, 306, and 307 can be a transistor whose channel is formed in an oxide semiconductor layer and the rest of them can be a transistor whose channel is formed in a silicon layer.

<Layout Example of Wirings>

Figure 4:
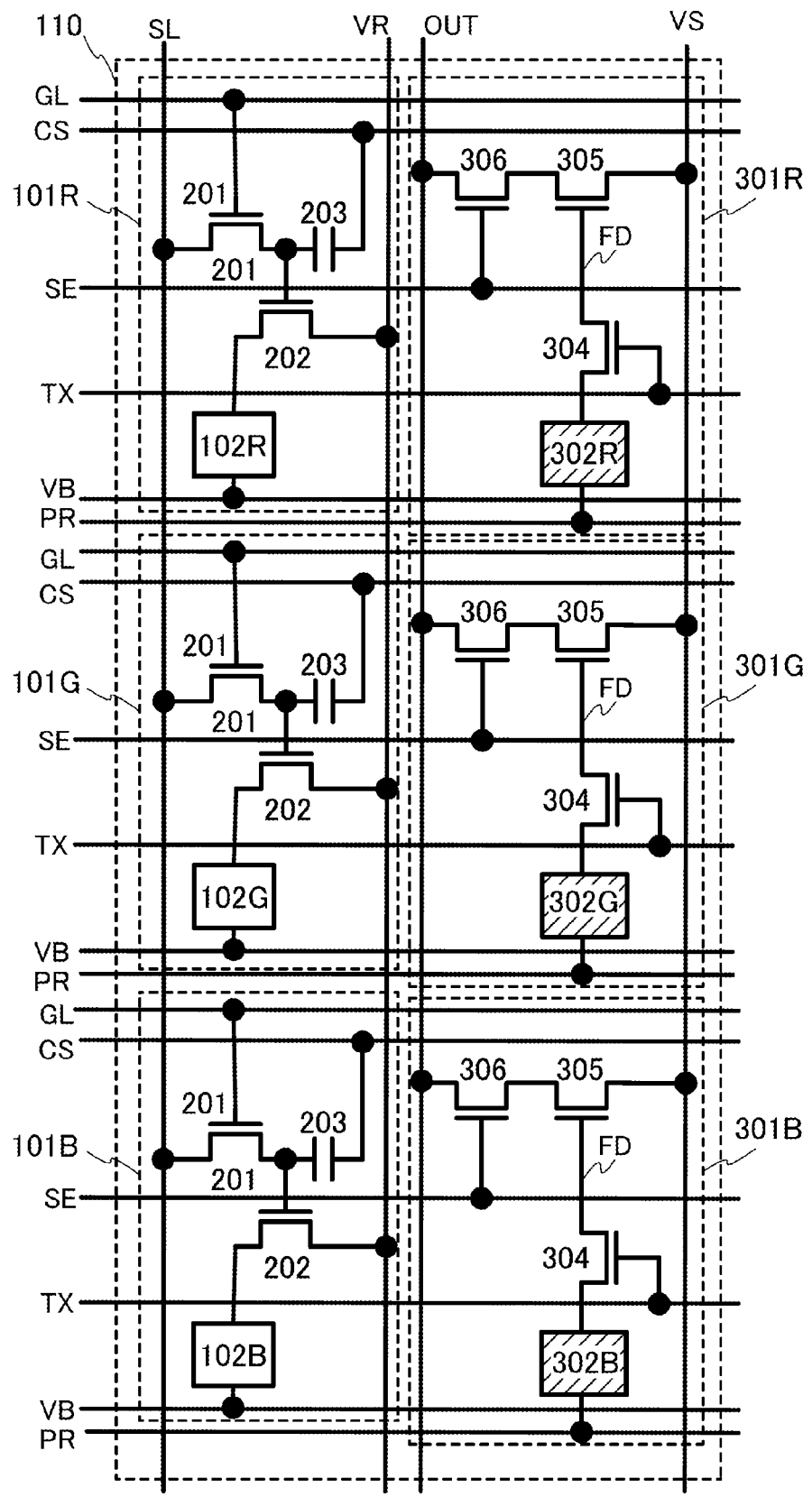
FIG. 4 is a circuit diagram illustrating a configuration of a combination of photosensors and display elements including light-emitting elements.

FIG. 4 illustrates a mode where the configurations illustrated in FIGS. 5A and 6A are employed in the configuration in FIG. 1A and the wiring VR, the wiring VS, the wiring SE, the wiring OUT, the wiring TX, the wiring PR, the wiring SL, the wiring GL, the wiring VB, and the wiring CS are extended. In FIG. 4, the wiring PR, the wiring TX, the wiring SE, the wiring GL, the wiring CS, and the wiring VB are arranged in parallel with each other. The wiring SL, the wiring OUT, the wiring VR, and the wiring VS are arranged in parallel with each other so as to intersect with the wiring PR, the wiring TX, the wiring SE, the wiring GL, the wiring CS, and the wiring VB. Note that it is possible to use one wiring as both the wiring VR and the wiring VS.

In FIG. 4, the row direction refers to the direction in which the wiring PR, the wiring TX, the wiring SE, the wiring GL, the wiring CS, and the wiring VB are extended. The column direction refers to the direction in which the wiring SL, the wiring OUT, the wiring VR, and the wiring VS are extended.

In FIG. 4, the display elements 101R, 101G, and 101B included in the combination 110 share the wiring SL and the wiring VR. The photosensors 301R, 301G, and 301B share the wiring OUT and the wiring VS.

The directions in which the wirings are extended and the layout of the wirings (e.g., one wiring is placed in parallel with another wiring or intersects with another wiring) can vary and are not limited to those in the configuration illustrated in FIG. 4.

When the control circuit 103 and the amplifier circuit 303 in FIG. 1A have any of the configurations illustrated in FIGS. 5B and 5C and FIGS. 6B to 6D, the wirings can be extended in specific directions as in FIG. 4.

Note that when a plurality of combinations 110 are arranged in matrix as illustrated in FIG. 1B, the combinations 110 arranged in the direction in which a given wiring is extended can share the wiring.

A plurality of photosensors placed in one sensor sub-row can share a wiring, for example, the wiring SE, the wiring TX, and/or the wiring PR. In addition, a plurality of display elements placed in one pixel sub-row can share a wiring, for example, the wiring GL, the wiring CS, and/or the wiring VB.

A plurality of display elements placed in one pixel sub-column can share a wiring, for example, the wiring SL and/or the wiring VR. In addition, a plurality of photosensors placed in one sensor sub-column can share a wiring, for example, the wiring OUT and/or the wiring VS.

A wiring is shared in such a manner, whereby the number of wirings in the semiconductor device can be reduced and the semiconductor device can have higher resolution.

Further, wirings to which the same potentials or the same signals are input can be shared between a plurality of combinations 110. For example, the wiring VB can be shared between all the plurality of combinations 110 arranged in matrix. In that case, the wiring VB can be called "electrode" instead of "wiring". Moreover, for instance, the wiring PR can be shared between a plurality of combinations 110. For example, the wiring PR can be shared between combinations in which a reset operation and a storage operation in the photosensors 301 are performed concurrently with each other.

Next, a method for driving the semiconductor device will be described. First, a method for driving the photosensor (the photosensor 301R, 301G, or 301B) alone will be described.

<Methods for Driving Photosensor>

An example of a method for driving the photosensor will be described.

<Photosensor Driving Method 1>

Figure 7A:
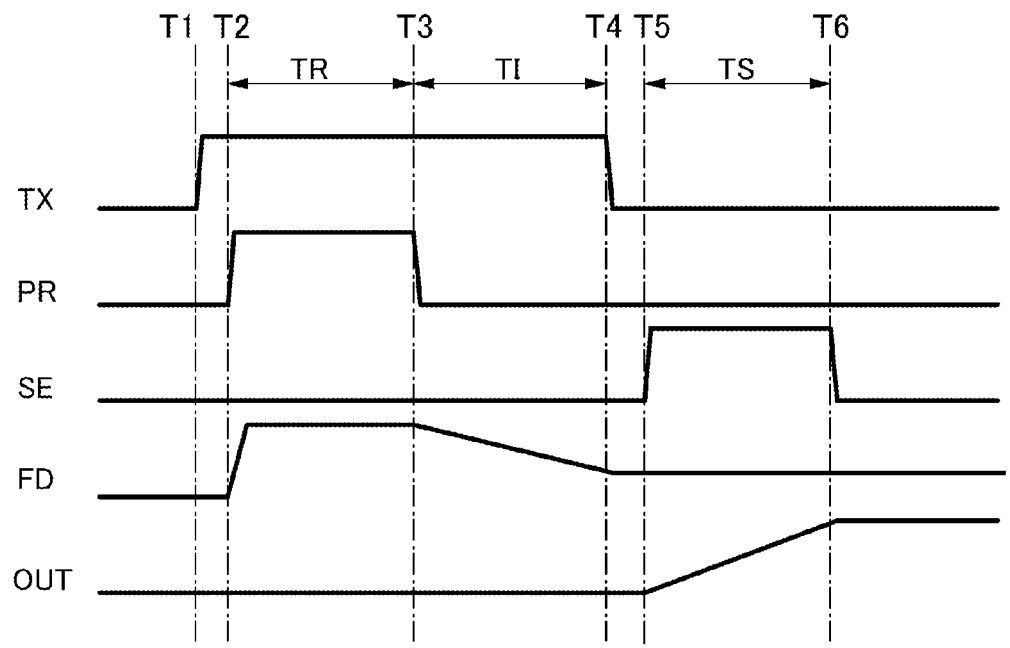
FIGS. 7A and 7B are timing charts each illustrating the operation of a photosensor.

A method for driving the photosensor 301 having any of the configurations illustrated in FIGS. 6A and 6B is described. FIG. 7A is an example of a timing chart showing changes in potentials of the wirings (the wiring TX, the wiring PR, the wiring SE, and the wiring OUT) and the node FD illustrated in FIGS. 6A and 6B. Note that an example where a photodiode is used as the photoelectric conversion element 302 is described.

Note that in the timing chart illustrated in FIG. 7A, for easy understanding of the operation of the photosensor 301, it is assumed that the wiring TX, the wiring SE, and the wiring PR are supplied with a high-level potential or a low-level potential. Specifically, it is assumed that the wiring TX is supplied with a high-level potential HTX and a low-level potential LTX; the wiring SE, a high-level potential HSE and a low-level potential LSE; and the wiring PR, a high-level potential HPR and a low-level potential LPR. The wiring VS is supplied with a predetermined potential, for example, a high-level power supply potential VDD.

Here, a description is given of an example of the case where an anode of the photodiode used as the photoelectric conversion element 302 is electrically connected to the wiring PR and a cathode thereof is electrically connected to the other of the source and the drain of the transistor 304. However, the present invention is not limited to this case; the cathode of the photodiode used as the photoelectric conversion element 302 may be electrically connected to the wiring PR and the anode thereof may be electrically connected to the other of the source and the drain of the transistor 304. If the cathode of the photodiode used as the photoelectric conversion element 302 is electrically connected to the wiring PR and the anode thereof is electrically connected to the other of the source and the drain of the transistor 304, the potentials of the wirings are set so that the bias state (a forward bias state and a reverse bias state) of the photoelectric conversion element 302 is the same as in the following description.

Note that the case where all of the transistors 304, 305, and 306 are n-channel transistors is described. However, the present invention is not limited to this example, and at least one or all of the transistors 304 to 306 may be p-channel transistors. If at least one or all of the transistors 304 to 306 are p-channel transistors, the potentials of the wirings are set so that the on state and off state of the transistors are the same as in the following description.

First, at a time T1, the potential of the wiring TX is switched from the potential LTX to the potential HTX. When the potential of the wiring TX changes to the potential HTX, the transistor 304 is turned on. Note that at the time T1, the wiring SE is supplied with the potential LSE, and the wiring PR is supplied with the potential LPR.

At a time T2, the potential of the wiring PR is switched from the potential LPR to the potential HPR. At the time T2, the potential of the wiring TX remains at the potential HTX, and the potential of the wiring SE remains at the potential LSE. A forward bias voltage is applied to the photoelectric conversion element 302. Accordingly, the potential HPR of the wiring PR is applied to the node FD, so that the potential of the node FD is reset to a predetermined value. This operation can be said to be an operation of discharging negative charge stored in the node FD. Note that in the case where the cathode of the photodiode used as the photoelectric conversion element 302 is electrically connected to the wiring PR and the anode thereof is electrically connected to the other of the source and the drain of the transistor 304, this operation can be said to be an operation of discharging positive charge stored in the node FD.

At a time T3, the potential of the wiring PR is switched from the potential HPR to the potential LPR. Until shortly before the time T3, the potential of the node FD remains at the potential HPR. Consequently, when the potential of the wiring PR changes to the potential LPR, a reverse bias voltage is applied to the photoelectric conversion element 302. Then, when light (e.g., light reflected from an object) enters the photoelectric conversion element 302 while a reverse bias voltage is applied to the photoelectric conversion element 302, a current (photocurrent) flows from the cathode toward the anode of the photoelectric conversion element 302. The value of photocurrent varies in accordance with the intensity of incident light. That is, as the intensity of light entering the photoelectric conversion element 302 is higher, the value of photocurrent is higher and the amount of charge transferred between the node FD and the photoelectric conversion element 302 is larger. On the other hand, as the intensity of light entering the photoelectric conversion element 302 is lower, the value of photocurrent is lower and the amount of charge transferred between the node FD and the photoelectric conversion element 302 is smaller. Thus, the higher the intensity of light is, the larger the amount of change in the potential of the node FD becomes; the lower the intensity of light is, the smaller the amount of change becomes.

FIG. 7A shows the example in which the potential of the node FD is decreased between the time T3 and a time T4 because negative charge is stored in the node FD; however, the present invention is not limited to this example. In the case where the cathode of the photodiode used as the photoelectric conversion element 302 is electrically connected to the wiring PR and the anode thereof is electrically connected to the other of the source and the drain of the transistor 304, it is possible that the potential of the node FD is increased because positive charge is stored in the node FD (i.e., negative charge is discharged from the node FD).

At the time T4, when the potential of the wiring TX is switched from the potential HTX to the potential LTX, the transistor 304 is turned off. Accordingly, the movement of charge between the node FD and the photoelectric conversion element 302 is stopped, so that the potential of the node FD is determined.

At a time T5, when the potential of the wiring SE is switched from the potential LSE to the potential HSE, the transistor 306 is turned on. Then, charge is transferred between the wiring VR and the wiring OUT in accordance with the potential of the node FD.

Note that an operation of setting the potential of the wiring OUT to a predetermined potential (a precharge operation) is completed before the time T5. FIG. 7A shows the case where the potential of the wiring OUT is precharged to a low-level potential before the time T5 and increased between the time T5 and a time T6 in accordance with the light intensity; however, the present invention is not limited to this case. The potential of the wiring OUT may be precharged to a high-level potential before the time T5 and decreased between the time T5 and the time T6 in accordance with the light intensity. In that case, a low-level power supply potential is applied to the wiring VS.

The precharge operation can be performed in the following manner, for example: an electrical connection between the wiring OUT and a wiring supplied with a predetermined potential is established through a switching element such as a transistor, and the transistor is turned on. After the precharge operation is completed, the transistor is turned off.

At the time T6, when the potential of the wiring SE is switched from the potential HSE to the potential LSE, the movement of charge from the wiring VS to the wiring OUT is stopped and the potential of the wiring OUT is determined. The potential of the wiring OUT corresponds to the potential of the output signal of the photosensor 301. The potential of the output signal includes data on light reflected from the object.

When the potential of the wiring TX is changed at the time T1 and the time T4, the potential of the node FD is changed by capacitive coupling between the wiring TX and the node FD. If the potential of the node FD is largely changed, the output signal cannot be correctly output. A reduction in the capacitance between the gate and source or between the gate and drain of the transistor 304 is effective in suppressing the change in the potential of the node FD at the time of changing the potential of the wiring TX. Moreover, it is effective to increase the gate capacitance of the transistor 305. Further, it is effective to electrically connect a capacitor to the node FD. Note that a change in the potential of the node FD at the time of changing the potential of the wiring TX is considered negligible in FIG. 7A, for example, by taking these measures.

The above is the method for driving the photosensor 301 having any of the configurations illustrated in FIGS. 6A and 6B.

<Photosensor Driving Method 2>

Figure 7B:
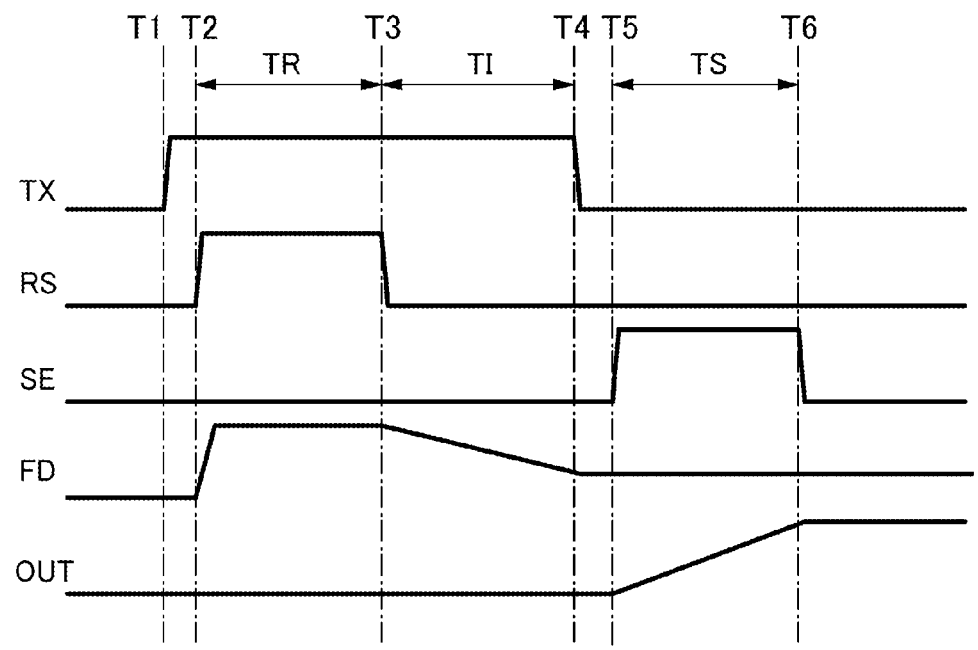

Next, a method for driving the photosensor 301 having any of the configurations illustrated in FIGS. 6C and 6D is described. FIG. 7B is an example of a timing chart showing changes in potentials of the wirings (the wiring TX, the wiring RS, the wiring SE, and the wiring OUT) and the node FD illustrated in FIGS. 6C and 6D. Note that an example where a photodiode is used as the photoelectric conversion element 302 is described.

Note that in the timing chart illustrated in FIG. 7B, for easy understanding of the operation of the photosensor 301, it is assumed that the wiring TX, the wiring RS, and the wiring SE are supplied with a high-level potential or a low-level potential. Specifically, it is assumed that the wiring TX is supplied with a high-level potential HTX and a low-level potential LTX; the wiring SE, a high-level potential HSE and a low-level potential LSE; and the wiring RS, a high-level potential HRS and a low-level potential LRS. The wiring PR is supplied with a predetermined potential, for example, a low-level power supply potential VSS. The wiring VS is supplied with a predetermined potential, for example, the high-level power supply potential VDD.

Here, a description is given of an example of the case where an anode of the photodiode used as the photoelectric conversion element 302 is electrically connected to the wiring PR and a cathode thereof is electrically connected to the other of the source and the drain of the transistor 304. However, the present invention is not limited to this case; the cathode of the photodiode used as the photoelectric conversion element 302 may be electrically connected to the wiring PR and the anode thereof may be electrically connected to the other of the source and the drain of the transistor 304. If the cathode of the photodiode used as the photoelectric conversion element 302 is electrically connected to the wiring PR and the anode thereof is electrically connected to the other of the source and the drain of the transistor 304, the potentials of the wirings are set so that the bias state (a forward bias state and a reverse bias state) of the photoelectric conversion element 302 is the same as in the following description.

Note that the case where all of the transistors 304, 305, 306, and 307 are n-channel transistors is described. However, the present invention is not limited to this example, and at least one or all of the transistors 304 to 307 may be p-channel transistors. If at least one or all of the transistors 304 to 307 are p-channel transistors, the potentials of the wirings are set so that the on state and off state of the transistors are the same as in the following description.

First, at a time T1, the potential of the wiring TX is switched from the potential LTX to the potential HTX. When the potential of the wiring TX changes to the potential HTX, the transistor 304 is turned on. Note that at the time T1, the wiring SE is supplied with the potential LSE, and the wiring RS is supplied with the potential LRS.

Then, at a time T2, the potential of the wiring RS is switched from the potential LRS to the potential HRS. When the potential of the wiring RS changes to the potential HRS, the transistor 307 is turned on. At the time T2, the potential of the wiring TX remains at the potential HTX, and the potential of the wiring SE remains at the potential LSE. Accordingly, the power supply potential VDD is supplied to the node FD, so that the potential of the node FD is reset to a predetermined value. A reverse bias voltage is applied to the photoelectric conversion element 302. This operation can be said to be an operation of discharging negative charge stored in the node FD. Note that in the case where the cathode of the photodiode used as the photoelectric conversion element 302 is electrically connected to the wiring PR and the anode thereof is electrically connected to the other of the source and the drain of the transistor 304, this operation can be said to be an operation of discharging positive charge stored in the node FD.

Next, at a time T3, the potential of the wiring RS is switched from the potential HRS to the potential LRS. Until shortly before the time T3, the potential of the node FD remains at the power supply potential VDD. Consequently, a reverse bias voltage continues to be applied to the photoelectric conversion element 302 even after the potential of the wiring RS changes to the potential LRS. Then, when light enters the photoelectric conversion element 302 in this state, a photocurrent flows from the cathode toward the anode of the photoelectric conversion element 302. The value of photocurrent varies in accordance with the intensity of light. That is, as the intensity of light entering the photoelectric conversion element 302 is higher, the value of photocurrent is higher and the amount of charge transferred between the node FD and the photoelectric conversion element 302 is larger. On the other hand, as the intensity of light entering the photoelectric conversion element 302 is lower, the value of photocurrent is lower and the amount of charge transferred between the node FD and the photoelectric conversion element 302 is smaller. Thus, the higher the intensity of light is, the larger the amount of change in the potential of the node FD becomes; the lower the intensity of light is, the smaller the amount of change becomes.

FIG. 7B shows the example in which the potential of the node FD is decreased between the time T3 and a time T4 because negative charge is stored in the node FD; however, the present invention is not limited to this example. In the case where the cathode of the photodiode used as the photoelectric conversion element 302 is electrically connected to the wiring PR and the anode thereof is electrically connected to the other of the source and the drain of the transistor 304, it is possible that the potential of the node FD is increased because positive charge is stored in the node FD (i.e., negative charge is discharged from the node FD).

Then, at the time T4, when the potential of the wiring TX is switched from the potential HTX to the potential LTX, the transistor 304 is turned off. Accordingly, the movement of charge between the node FD and the photoelectric conversion element 302 is stopped, so that the potential of the node FD is determined.

Next, at a time T5, when the potential of the wiring SE is switched from the potential LSE to the potential HSE, the transistor 306 is turned on. Then, charge is transferred between the wiring VS and the wiring OUT in accordance with the potential of the node FD.

Note that an operation of setting the potential of the wiring OUT to a predetermined potential (a precharge operation) is completed before the time T5. FIG. 7B shows the case where the potential of the wiring OUT is precharged to a low-level potential before the time T5 and increased between the time T5 and a time T6 in accordance with the light intensity; however, the present invention is not limited to this case. The potential of the wiring OUT may be precharged to a high-level potential before the time T5 and decreased between the time T5 and the time T6 in accordance with the light intensity. In that case, a low-level power supply potential is applied to the wiring VS.

The precharge operation can be performed in the following manner, for example: an electrical connection between the wiring OUT and a wiring supplied with a predetermined potential is established through a switching element such as a transistor, and the transistor is turned on. After the precharge operation is completed, the transistor is turned off.

At the time T6, when the potential of the wiring SE is switched from the potential HSE to the potential LSE, the movement of charge from the wiring VS to the wiring OUT is stopped and the potential of the wiring OUT is determined. The potential of the wiring OUT corresponds to the potential of the output signal of the photosensor 301. The potential of the output signal includes data on light reflected from the object.

When the potential of the wiring TX is changed at the time T1 and the time T4, the potential of the node FD is changed by capacitive coupling between the wiring TX and the node FD. If the potential of the node FD is largely changed, the output signal cannot be correctly output. A reduction in the capacitance between the gate and source or between the gate and drain of the transistor 304 is effective in suppressing the change in the potential of the node FD at the time of changing the potential of the wiring TX. Moreover, it is effective to increase the gate capacitance of the transistor 305. Further, it is effective to electrically connect a capacitor to the node FD. Note that a change in the potential of the node FD at the time of changing the potential of the wiring TX is considered negligible in FIG. 7B, for example, by taking these measures.

The above is the method for driving the photosensor 301 having any of the configurations illustrated in FIGS. 6C and 6D.

The above-described series of operations of the photosensor 301, which are shown in the timing charts of FIGS. 7A and 7B, can be classified into a reset operation, a storage operation, and a selection operation. In other words, the operation from the time T2 to the time T3 corresponds to the reset operation; the operation from the time T3 to the time T4, the storage operation; and the operation from the time T5 to the time T6, the selection operation. A period after the end of the storage operation and before the start of the selection operation, that is, a period from the time T4 to the time T5 corresponds to a charge retention period during which charge is held in the node FD. Here, a period for performing the reset operation is denoted by TR; a period for performing the storage operation, TI; and a period for performing the selection operation, TS.

The above is the description of the methods for driving the photosensor 301.

<Method for Driving Semiconductor Device>

A method for driving the semiconductor device in which a plurality of combinations 110 in FIG. 4 are arranged in matrix as illustrated in FIG. 1B will be described with reference to timing charts in FIG. 2 and FIG. 11.

Specifically, a description is given of an example of a method for driving a semiconductor device in which the wiring SE, the wiring TX, and the wiring PR are shared between a plurality of photosensors placed in one sensor sub-row; the wiring GL, the wiring CS, and the wiring VB are shared between a plurality of display elements placed in one pixel sub-row; the wiring SL and the wiring VR are shared between a plurality of display elements placed in one pixel sub-column; and the wiring OUT and the wiring VS are shared between a plurality of photosensors placed in one sensor sub-column.

In FIG. 2 and FIG. 11, (p,q) represents a combination of a p-th row and a q-th column (p and q are each a natural number) among the combinations 110 arranged in matrix. The timing chart in FIG. 2 shows the relation between the operations of the display elements 101R, 101G, and 101B and the operations of the photosensors 301R, 301G, and 301B; the display elements 101R, 101G, and 101B and the photosensors 301R, 301G, and 301B are provided in each of six combinations 110. In FIG. 2, TR+TI represents a period for performing the reset operation and the storage operation subsequent to the reset operation, which is described using the timing charts in FIGS. 7A and 7B. In addition, in FIG. 2, "R" represents a period during which the light-emitting element emits light of a first hue (e.g., red); "G" represents a period during which the light-emitting element emits light of a second hue (e.g., green); and "B" represents a period during which the light-emitting element emits light of a third hue (e.g., blue). The timing chart in FIG. 11 shows the relation between the operations of the photosensors 301R, 301G, and 301B, which are provided in each of six combinations 110. In FIG. 11, TS represents a period for performing the selection operation, described using the timing charts in FIGS. 7A and 7B.

First, an operation of receiving light for obtaining object data corresponding to each hue will be described with reference to the timing chart in FIG. 2.

In a period from a time TL1 to a time TL2, the reset operation is concurrently performed and then the storage operation is concurrently performed in all the photosensors 301R while the light-emitting elements 102R concurrently emit light and the light-emitting elements 102G and 102B do not emit light. In a period from a time TL3 to a time TL4, the reset operation is concurrently performed and then the storage operation is concurrently performed in all the photosensors 301G while the light-emitting elements 102G concurrently emit light and the light-emitting elements 102R and 102B do not emit light. In a period from a time TL5 to a time TL6, the reset operation is concurrently performed and then the storage operation is concurrently performed in all the photosensors 301B while the light-emitting elements 102B concurrently emit light and the light-emitting elements 102R and 102G do not emit light.

Here, in the period from the time TL1 to the time TL2, all the light-emitting elements 102R are made to emit light with the same (or substantially the same) luminance. In the period from the time TL3 to the time TL4, all the light-emitting elements 102G are made to emit light with the same (or substantially the same) luminance. In the period from the time TL5 to the time TL6, all the light-emitting elements 102B are made to emit light with the same (or substantially the same) luminance.

In such a manner, light reception for obtaining object data corresponding to each hue can be performed.

The operation in the timing chart of FIG. 2 can be performed, for example, in a blanking interval during a period when the semiconductor device displays images.

In the case where a plurality of photosensors corresponding to the same hue are arranged in one sensor sub-row and share a wiring extended in the row direction of the sensor sub-row, the plurality of photosensors can be concurrently controlled by selecting only some of the wirings that are included in the display and data input region of the semiconductor device and extended in the row direction. For example, when the combinations 110 each include three sensor sub-rows corresponding to three different hues, light reception for obtaining object data corresponding to one hue can be performed by selecting only one third of the wirings. In such a manner, the semiconductor device can rapidly perform each of the light reception operations for obtaining object data corresponding to each of the hues.

Next, an operation of reading data on the object (data on light reflected from the object), which corresponds to each hue, from each photosensor will be described with reference to the timing chart in FIG. 11. The timing chart in FIG. 11 illustrates the operation performed after the operation shown in FIG. 2 ends.

As illustrated in FIG. 11, the selection operation is sequentially performed in the photosensors 301R on a sensor sub-row basis, the selection operation is sequentially performed in the photosensors 301G on a sensor sub-row basis, and the selection operation is sequentially performed in the photosensors 301B on a sensor sub-row basis.

Thus, a color image corresponding to the object can be obtained.

Note that the selection operation in the photosensors can be performed regardless of the state (a light-emitting state or a non-light-emitting state) of the light-emitting elements included in the semiconductor device. As a result, the selection operation can be performed in the photosensors while the semiconductor device displays images. Therefore, image display is not much affected even if a period necessary to perform the selection operation in all of a plurality of photosensors is long.

When the driving method illustrated in FIG. 2 and FIG. 11 is employed, a plurality of photosensors included in the semiconductor device have different lengths of the period after the end of the reset operation and the storage operation and before the start of the selection operation (i.e., the charge retention period). If leakage is large in elements included in the photosensor, as the charge retention period is longer, noise included in obtained data is increased and it becomes more difficult to obtain object data correctly in a plurality of photosensors. Here, when a transistor is used as an element included in the photosensor and the transistor is in particular a transistor whose channel is formed in an oxide semiconductor layer, leakage due to the off-state current of the transistor can be reduced. Thus, the influence of noise can be reduced even if the period after the end of the reset operation and the storage operation and before the start of the selection operation (the charge retention period) is long. In the above manner, object data can be correctly obtained by employing the driving method shown in FIG. 2 and FIG. 11.

As described above, a color image corresponding to an object can be obtained with less influence on normal image display.

This embodiment can be combined as appropriate with any of the other embodiments.

Embodiment 2

In this embodiment, a more specific embodiment of the method for driving display elements, which is described using the timing chart in FIG. 2 of Embodiment 1, will be described. The description is made using a timing chart in FIG. 3 and reference numerals in other drawings. Note that the structure of a semiconductor device that operates with the driving method shown in the timing chart in FIG. 3 is the same as that of the semiconductor device which is described in Embodiment 1 and assumed to perform the operation in the timing chart in FIG. 2; therefore, the description thereof is not repeated.

<Method for Driving Display Elements>

Figure 3:
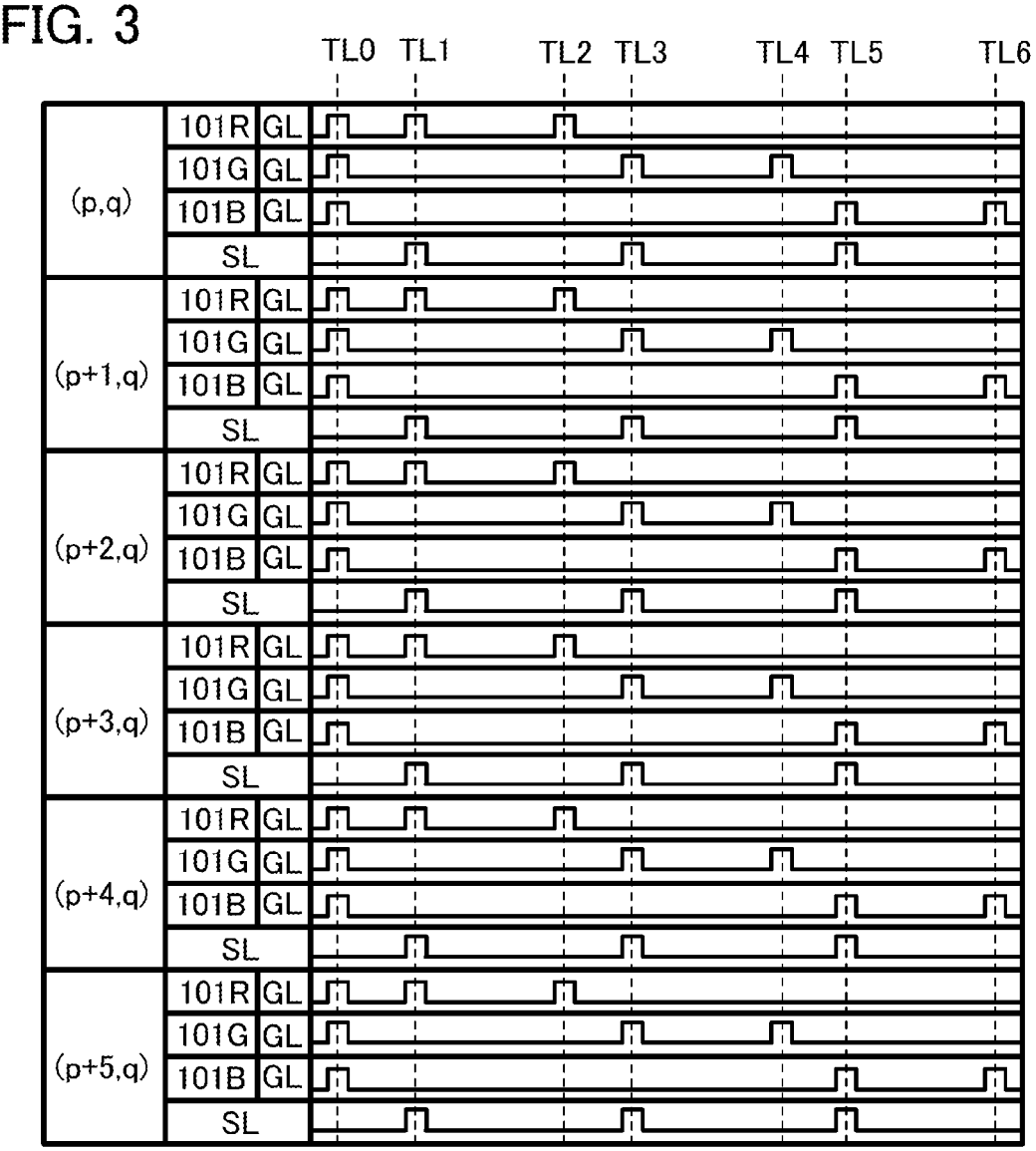
FIG. 3 is a timing chart illustrating the operation of a plurality of display elements arranged in matrix.

In FIG. 3, (p,q) represents a combination of a p-th row and a q-th column among the combinations 110 arranged in matrix. The timing chart of FIG. 3 shows the levels of the potentials of the wiring GL and the wiring SL electrically connected to the display element 101R, the wiring GL and the wiring SL electrically connected to the display element 101G, and the wiring GL and the wiring SL electrically connected to the display element 101B. The display elements 101R, 101G, and 101B are provided in each of six combinations 110. Since the wiring SL is shared between six combinations 110, the same signal is input to the wiring SL in each combination.

Note that in the timing chart illustrated in FIG. 3, it is assumed that the wiring GL and the wiring SL are supplied with a high-level potential or a low-level potential. The wiring VR is supplied with a predetermined potential. The wiring VB is supplied with a predetermined potential. The difference between the potential supplied to the wiring VR and the potential supplied to the wiring VB is set so that the light-emitting element 102 (the light-emitting elements 102R, 102G, and 102B) emits light when a voltage corresponding to the potential difference is applied between a pair of the electrodes of the light-emitting element. For example, the wiring VR is supplied with the high-level power supply potential VDD, and the wiring VB is supplied with the low-level power supply potential VSS.

Note that the case where both of the transistors 201 and 202 are n-channel transistors is described. However, the present invention is not limited to this example, and one or both of the transistors 201 and 202 may be p-channel transistors. If one or both of the transistors 201 and 202 are p-channel transistors, the potentials of the wirings are set so that the on state and off state of the transistors are the same as in the following description.

At a time TL0, when the potentials of the wirings GL in all the display elements (the display elements 101R, 101G, and 101B) are set at high level, the transistors 201 in all the display elements (the display elements 101R, 101G, and 101B) are turned on. At this time, when the potential of the wiring SL is set at low level, the transistors 202 in all the display elements (the display elements 101R, 101G, and 101B) are turned off. Thus, the light-emitting elements (the light-emitting elements 102R, 102G, and 102B) in all the display elements (the display elements 101R, 101G, and 101B) can be brought into a non-light-emitting state.

At the time TL1, when the potential of the wiring GL electrically connected to the display element 101R corresponding to the first hue is set at high level, the transistor 201 in the display element 101R corresponding to the first hue is turned on. At this time, when the potential of the wiring SL is set at high level, the transistor 202 in the display element 101R corresponding to the first hue is also turned on. Then, the potential of the wiring VR is input to one of a pair of electrodes of the light-emitting element 102R in the display element 101R corresponding to the first hue through the transistor 202 in the display element 101R corresponding to the first hue. Thus, a predetermined voltage is applied between the pair of electrodes of the light-emitting element 102R, and the light-emitting element 102R emits light. Since the gate potential of the transistor 202 in the display element 101R corresponding to the first hue is maintained by the capacitor 203, parasitic capacitance, or the like after the time TL1, the light-emitting element 102R keeps emitting light even after the potential of the wiring GL electrically connected to the display element 101R corresponding to the first hue is set at low level and the transistor 201 is turned off.

Then, at the time TL2, when the potential of the wiring GL electrically connected to the display element 101R corresponding to the first hue is set at high level again, the transistor 201 in the display element 101R corresponding to the first hue is turned on. At this time, the transistor 202 in the display element 101R corresponding to the first hue can be turned off by setting the potential of the wiring SL at low level. Thus, the light-emitting element 102R can be brought into a non-light-emitting state.

In such a manner, a display and data input region in the semiconductor device emits light of the first hue (e.g., red) in a period from the time TL1 to the time TL2.

At the time TL3, when the potential of the wiring GL electrically connected to the display element 101G corresponding to the second hue is set at high level, the transistor 201 in the display element 101G corresponding to the second hue is turned on. At this time, when the potential of the wiring SL is set at high level, the transistor 202 in the display element 101G corresponding to the second hue is also turned on. Then, the potential of the wiring VR is input to one of a pair of electrodes of the light-emitting element 102G in the display element 101G corresponding to the second hue through the transistor 202 in the display element 101G corresponding to the second hue. Thus, a predetermined voltage is applied between the pair of electrodes of the light-emitting element 102G, and the light-emitting element 102G emits light. Since the gate potential of the transistor 202 in the display element 101G corresponding to the second hue is maintained by the capacitor 203, parasitic capacitance, or the like after the time TL3, the light-emitting element 102G keeps emitting light even after the potential of the wiring GL electrically connected to the display element 101G corresponding to the second hue is set at low level and the transistor 201 is turned off.

Then, at the time TL4, when the potential of the wiring GL electrically connected to the display element 101G corresponding to the second hue is set at high level again, the transistor 201 in the display element 101G corresponding to the second hue is turned on. At this time, the transistor 202 in the display element 101G corresponding to the second hue can be turned off by setting the potential of the wiring SL at low level. Thus, the light-emitting element 102G can be brought into a non-light-emitting state.

In such a manner, the display and data input region in the semiconductor device emits light of the second hue (e.g., green) in a period from the time TL3 to the time TL4.

At the time TL5, when the potential of the wiring GL electrically connected to the display element 101B corresponding to the third hue is set at high level, the transistor 201 in the display element 101B corresponding to the third hue is turned on. At this time, when the potential of the wiring SL is set at high level, the transistor 202 in the display element 101B corresponding to the third hue is also turned on. Then, the potential of the wiring VR is input to one of a pair of electrodes of the light-emitting element 102B in the display element 101B corresponding to the third hue through the transistor 202 in the display element 101B corresponding to the third hue. Thus, a predetermined voltage is applied between the pair of electrodes of the light-emitting element 102B, and the light-emitting element 102B emits light. Since the gate potential of the transistor 202 in the display element 101B corresponding to the third hue is maintained by the capacitor 203, parasitic capacitance, or the like after the time TL5, the light-emitting element 102B keeps emitting light even after the potential of the wiring GL electrically connected to the display element 101B corresponding to the third hue is set at low level and the transistor 201 is turned off.

Then, at the time TL6, when the potential of the wiring GL electrically connected to the display element 101B corresponding to the third hue is set at high level again, the transistor 201 in the display element 101B corresponding to the third hue is turned on. At this time, the transistor 202 in the display element 101B corresponding to the third hue can be turned off by setting the potential of the wiring SL at low level. Thus, the light-emitting element 102B can be brought into a non-light-emitting state.

In such a manner, the display and data input region in the semiconductor device emits light of the third hue (e.g., blue) in a period from the time TL5 to the time TL6.

The display elements can be driven as described above.

In the driving method described in this embodiment, a plurality of display elements corresponding to the same hue are arranged in one pixel sub-row, share a wiring extended in the row direction of the pixel sub-row, and are concurrently controlled by selecting only some of the wirings that are included in the display and data input region of the semiconductor device and extended in the row direction. For example, when the combinations 110 each include three pixel sub-rows corresponding to three different hues, the display and data input region emits light of one hue and turns off the light of one hue by selecting only one third of the wirings. In such a manner, the semiconductor device can rapidly perform each of the light reception operations for obtaining object data corresponding to each of the hues.

In addition, when the same signal is concurrently input to all the wirings SL included in the display and data input region of the semiconductor device, light emission corresponding to each hue can be performed in an extremely short time. Thus, the semiconductor device can rapidly perform each of the light emission operations corresponding to each of the hues.

Consequently, a color image corresponding to an object can be obtained with less influence on normal image display.

This embodiment can be combined as appropriate with any of the other embodiments.

Embodiment 3

In this embodiment, a method for driving a semiconductor device according to one embodiment of the present invention, which is different from that in Embodiment 1, will be described.

<One Embodiment of Structure of Semiconductor Device>

Figure 8A:
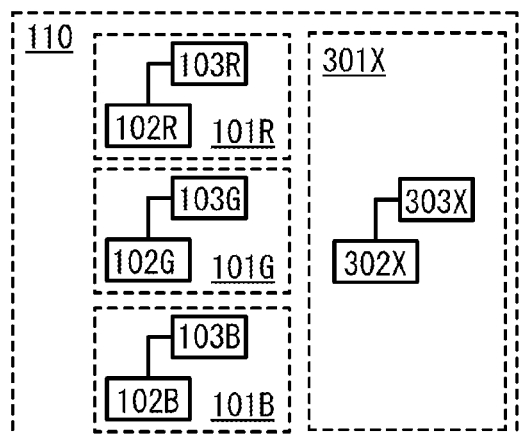
FIG. 8A illustrates a configuration of a combination of a photosensor and display elements including light-emitting elements.
Figure 8B:
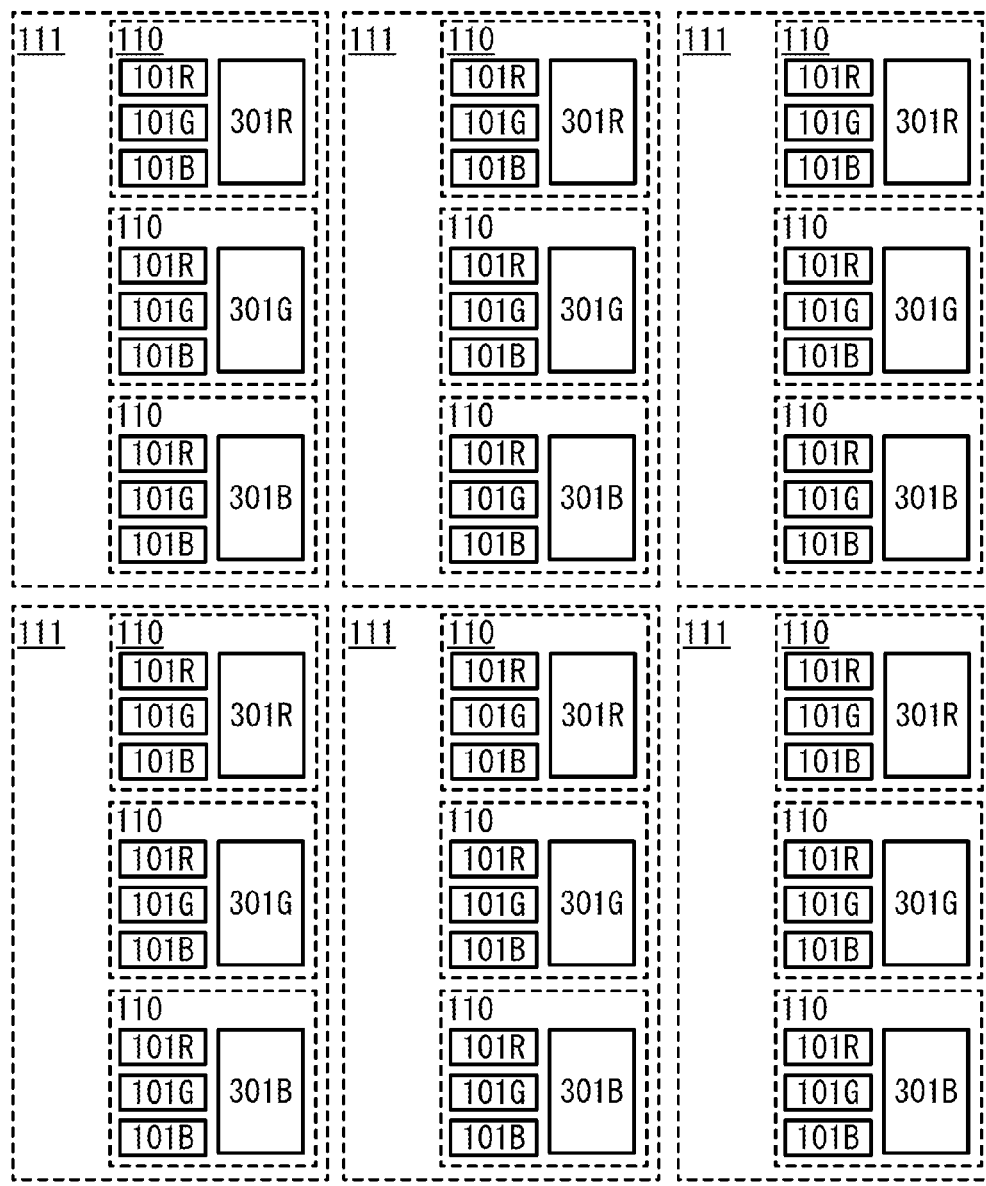
FIG. 8B illustrates a configuration of a plurality of combinations arranged in matrix.

First, the structure of the semiconductor device will be described with reference to FIGS. 8A and 8B. FIG. 8A is a schematic diagram of the configuration of part of a display and data input region in the semiconductor device. In FIG. 8A, the combination 110 includes the display element 101R, the display element 101G, the display element 101B, and a photosensor 301X. The photosensor 301X is one of the photosensor 301R, the photosensor 301G, and the photosensor 301B. A group 111 is composed of the combination 110 including the display elements 101R, 101G, and 101B and the photosensor 301R; the combination 110 including the display elements 101R, 101G, and 101B and the photosensor 301G; and the combination 110 including the display elements 101R, 101G and 101B and the photosensor 301B. As illustrated in FIG. 8B, the display and data input region in the semiconductor device includes a plurality of groups 111 arranged in matrix. Note that FIG. 8B shows an example where the groups 111 of two rows and three columns are provided; however, this is not a limiting example. In general, a plurality of groups 111 can be arranged in a matrix of m rows and n columns (m and n are each a natural number).

Note that the configuration in FIG. 8B can be considered to be a configuration in which the combinations 110 are arranged in a matrix of six rows and three columns. A description is given below, regarding the configuration as one in which a plurality of combinations 110 are arranged in matrix.

In FIGS. 8A and 8B, the display element 101R includes the light-emitting element 102R that emits light of the first hue (e.g., red) and the control circuit 103R that controls the light-emitting element 102R. The display element 101G includes the light-emitting element 102G that emits light of the second hue (e.g., green) different from the first hue, and the control circuit 103G that controls the light-emitting element 102G. The display element 101B includes the light-emitting element 102B that emits light of the third hue (e.g., blue) different from the first hue and the second hue, and the control circuit 103B that controls the light-emitting element 102B. The photosensor 301R includes the photoelectric conversion element 302R that receives light of the first hue and the amplifier circuit 303R that is electrically connected to the photoelectric conversion element 302R. The photosensor 301G includes the photoelectric conversion element 302G that receives light of the second hue and the amplifier circuit 303G that is electrically connected to the photoelectric conversion element 302G. The photosensor 301B includes the photoelectric conversion element 302B that receives light of the third hue and the amplifier circuit 303B that is electrically connected to the photoelectric conversion element 302B.

As illustrated in FIG. 8B, in the plurality of combinations 110 arranged in one column, the display elements 101R, the display elements 101G, and the display elements 101B can be arranged in one direction. The one direction can be the column direction of the combinations 110 arranged in matrix (the direction in which the combinations 110 in the same column are disposed). Further, in the plurality of combinations 110 arranged in one column, the photosensors 301R, the photosensors 301G, and the photosensors 301B can be arranged in one direction. The one direction can be the column direction of the combinations 110 arranged in matrix (the direction in which the combinations 110 in the same column are disposed). Here, it can be said that a "column" (a pixel sub-column) of the display elements corresponding to different hues and a "column" (a sensor sub-column) of the photosensors corresponding to different hues constitute one column of the combinations 110.

Here, the photosensors corresponding to the same hue can be arranged in one direction as illustrated in FIG. 8B. The one direction can be the row direction of the combinations 110 arranged in matrix (the direction in which the combinations 110 in the same row are disposed). In the configuration in FIG. 8B, one of a "row" (a sensor sub-row) of the photosensors 301R, a "row" (a sensor sub-row) of the photosensors 301G, and a "row" (a sensor sub-row) of the photosensors 301B corresponds to one row of the combinations 110. In other words, in one given sensor sub-row of a plurality of photosensors, the plurality of photosensors can be photosensors corresponding to the same hue. Moreover, in another sensor sub-row of a plurality of photosensors, the plurality of photosensors can be photosensors corresponding to a hue different from the above hue.

In addition, the display elements corresponding to the same hue can be arranged in one direction. The one direction can be the row direction of the combinations 110 arranged in matrix (the direction in which the combinations 110 in the same row are disposed). In the configuration in FIG. 8B, a "row" (a pixel sub-row) of the display elements 101R, a "row" (a pixel sub-row) of the display elements 101G, and a "row" (a pixel sub-row) of the display elements 101B, that is, three pixel sub-rows correspond to one row of the combinations 110. In other words, in one given pixel sub-row of a plurality of display elements, the plurality of display elements can be display elements corresponding to the same hue. Moreover, in another pixel sub-row of a plurality of display elements, the plurality of display elements can be display elements corresponding to a hue different from the above hue.

FIGS. 8A and 8B illustrate the example in which the group 111 includes photosensors corresponding to three different hues and display elements corresponding to three different hues; however, this is not a limiting example. The number of photosensors included in the group 111 and the number of corresponding hues can be any number. Further, the number of display elements included in the group 111 and the number of corresponding hues can be any number.

<One Embodiment of Specific Configuration of Display Element>

Specific configurations of the display elements 101R, 101G, and 101B and the control circuits 103R, 103G, and 103B can be the same as those described in Embodiment 1; therefore, the description is not repeated.

<One Embodiment of Specific Configuration of Photosensor>

Specific configurations of the photosensors 301R, 301G, and 301B and the amplifier circuits 303R, 303G, and 303B can be the same as those described in Embodiment 1; therefore, the description is not repeated. Note that the photosensor 301X in FIG. 8A includes a photoelectric conversion element 302X and an amplifier circuit 303X. The photoelectric conversion element 302X corresponds to one of the photoelectric conversion elements 302R, 302G, and 302B. The amplifier circuit 303X corresponds to one of the amplifier circuits 303R, 303G, and 303B.

<Layout Example of Wirings>

Figure 10:
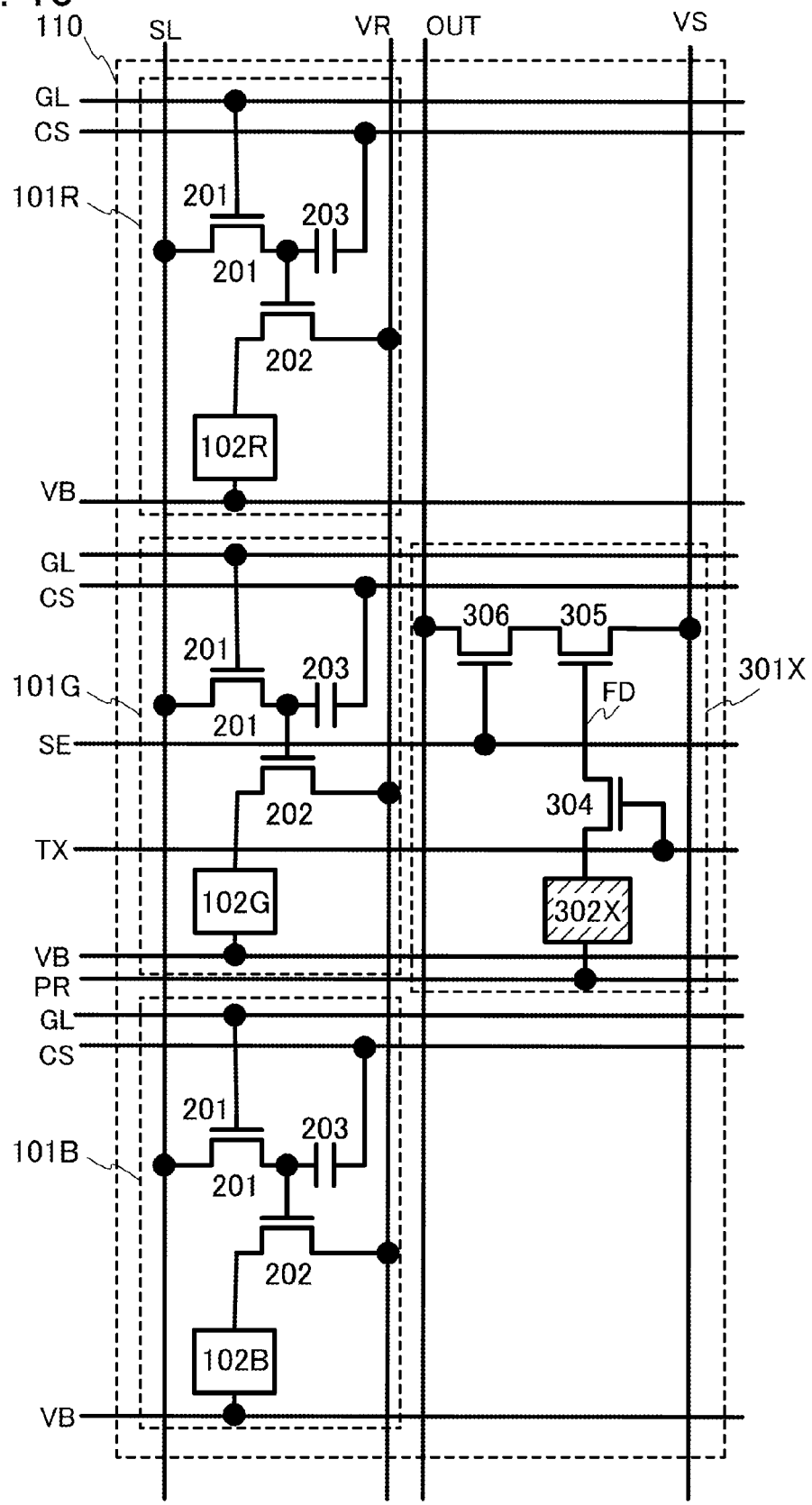
FIG. 10 is a circuit diagram illustrating a configuration of a combination of a photosensor and display elements including light-emitting elements.

FIG. 10 illustrates a mode where the configurations illustrated in FIGS. 5A and 6A are employed in the configuration in FIG. 8A and the wiring VR, the wiring VS, the wiring SE, the wiring OUT, the wiring TX, the wiring PR, the wiring SL, the wiring GL, the wiring VB, and the wiring CS are extended. In FIG. 10, the wiring PR, the wiring TX, the wiring SE, the wiring GL, the wiring CS, and the wiring VB are arranged in parallel with each other. The wiring SL, the wiring OUT, the wiring VR, and the wiring VS are arranged in parallel with each other so as to intersect with the wiring PR, the wiring TX, the wiring SE, the wiring GL, the wiring CS, and the wiring VB. Note that it is possible to use one wiring as both the wiring VR and the wiring VS.

In FIG. 10, the row direction refers to the direction in which the wiring PR, the wiring TX, the wiring SE, the wiring GL, the wiring CS, and the wiring VB are extended. The column direction refers to the direction in which the wiring SL, the wiring OUT, the wiring VR, and the wiring VS are extended.

In FIG. 10, the display elements 101R, 101G, and 101B included in the combination 110 share the wiring SL and the wiring VR.

The directions in which the wirings are extended and the layout of the wirings (e.g., one wiring is placed in parallel with another wiring or intersects with another wiring) can vary and are not limited to those in the configuration illustrated in FIG. 10.

When any of the above-described configurations illustrated in FIGS. 5B and 5C and FIGS. 6B to 6D are employed in FIG. 8A, the wirings can be extended in specific directions as in FIG. 10.

Note that when a plurality of combinations 110 are arranged in matrix as illustrated in FIG. 8B, the combinations 110 arranged in the direction in which a given wiring is extended can share the wiring.

A plurality of photosensors placed in one sensor sub-row can share a wiring, for example, the wiring SE, the wiring TX, and/or the wiring PR. In addition, a plurality of display elements placed in one pixel sub-row can share a wiring, for example, the wiring GL, the wiring CS, and/or the wiring VB.

A plurality of display elements placed in one pixel sub-column can share a wiring, for example, the wiring SL and/or the wiring VR. In addition, a plurality of photosensors placed in one sensor sub-column can share a wiring, for example, the wiring OUT and/or the wiring VS.

A wiring is shared in such a manner, whereby the number of wirings in the semiconductor device can be reduced and the semiconductor device can have higher resolution.

Further, wirings to which the same potentials or the same signals are input can be shared between a plurality of combinations 110. For example, the wiring VB can be shared between all the plurality of combinations 110 arranged in matrix. In that case, the wiring VB can be called "electrode" instead of "wiring". Moreover, for instance, the wiring PR can be shared between a plurality of combinations 110. For example, the wiring PR can be shared between combinations in which a reset operation and a storage operation in the photosensors 301 are performed concurrently with each other.

<Method for Driving Semiconductor Device>

Next, a method for driving the semiconductor device will be described. The method for driving the photosensor (the photosensor 301R, 301G, or 301B) alone is the same as that described in Embodiment 1; therefore, the description is not repeated.

A method for driving the semiconductor device in which a plurality of combinations 110 are arranged in matrix as illustrated in FIG. 8B will be described with reference to timing charts in FIG. 9 and FIG. 12. Note that the case where the combinations 110 in FIG. 8B have the configuration illustrated in FIG. 10 is described.

Specifically, a description is given of an example of a method for driving a semiconductor device in which the wiring SE, the wiring TX, and the wiring PR are shared between a plurality of photosensors placed in one sensor sub-row; the wiring GL, the wiring CS, and the wiring VB are shared between a plurality of display elements placed in one pixel sub-row; the wiring SL and the wiring VR are shared between a plurality of display elements placed in one pixel sub-column; and the wiring OUT and the wiring VS are shared between a plurality of photosensors placed in one sensor sub-column.

Figure 9:
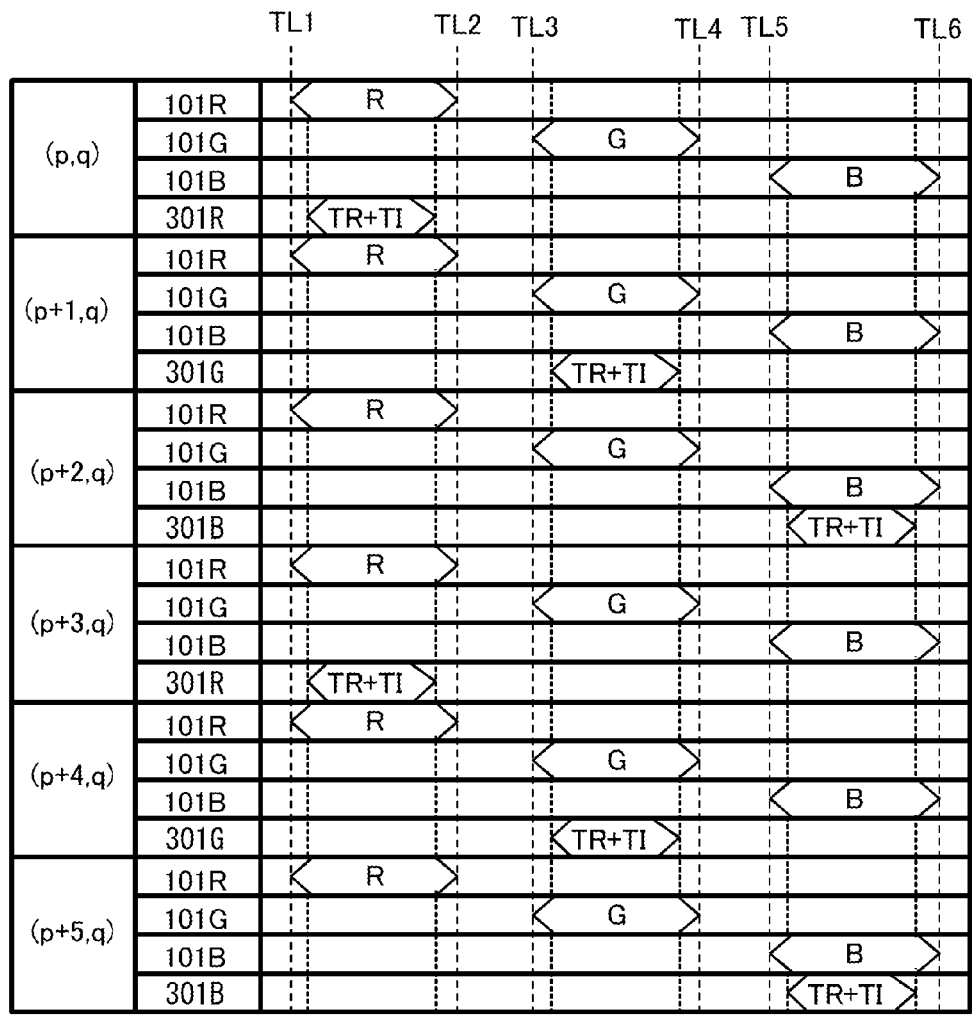
FIG. 9 is a timing chart illustrating the operation of a semiconductor device.

In FIG. 9 and FIG. 12, (p,q) represents a combination of a p-th row and a q-th column (p and q are each a natural number) among the combinations 110 arranged in matrix. The timing chart in FIG. 9 shows the relation between the operations of the display elements 101R, 101G, and 101B provided in each of six combinations 110 and the operations of the photosensors 301R, 301G, and 301B one of which is provided in each combination 110. In FIG. 9, TR+TI represents a period for performing the reset operation and the storage operation subsequent to the reset operation, which is described using the timing charts in FIGS. 7A and 7B. In addition, in FIG. 9, "R" represents a period during which the light-emitting element emits light of the first hue (e.g., red); "G" represents a period during which the light-emitting element emits light of the second hue (e.g., green); and "B" represents a period during which the light-emitting element emits light of the third hue (e.g., blue). The timing chart in FIG. 12 shows the relation between the operations of the photosensors 301R, 301G, and 301B, one of which is provided in each of six combinations 110. In FIG. 12, TS represents a period for performing the selection operation, described using the timing charts in FIGS. 7A and 7B.

First, an operation of receiving light for obtaining object data corresponding to each hue will be described with reference to the timing chart in FIG. 9.

In a period from a time TL1 to a time TL2, the reset operation is concurrently performed and then the storage operation is concurrently performed in all the photosensors 301R while the light-emitting elements 102R concurrently emit light and the light-emitting elements 102G and 102B do not emit light. In a period from a time TL3 to a time TL4, the reset operation is concurrently performed and then the storage operation is concurrently performed in all the photosensors 301G while the light-emitting elements 102G concurrently emit light and the light-emitting elements 102R and 102B do not emit light. In a period from a time TL5 to a time TL6, the reset operation is concurrently performed and then the storage operation is concurrently performed in all the photosensors 301B while the light-emitting elements 102B concurrently emit light and the light-emitting elements 102R and 102G do not emit light.

Here, in the period from the time TL1 to the time TL2, all the light-emitting elements 102R are made to emit light with the same (or substantially the same) luminance. In the period from the time TL3 to the time TL4, all the light-emitting elements 102G are made to emit light with the same (or substantially the same) luminance. In the period from the time TL5 to the time TL6, all the light-emitting elements 102B are made to emit light with the same (or substantially the same) luminance.

In such a manner, light reception for obtaining object data corresponding to each hue can be performed.

The operation in the timing chart of FIG. 9 can be performed, for example, in a blanking interval during a period when the semiconductor device displays images.

In the case where a plurality of photosensors corresponding to the same hue are arranged in one sensor sub-row and share a wiring extended in the row direction of the sensor sub-row, the plurality of photosensors can be concurrently controlled by selecting only some of the wirings that are included in the display and data input region of the semiconductor device and extended in the row direction. For example, when the groups 111 each include three sensor sub-rows corresponding to three different hues, light reception for obtaining object data corresponding to one hue can be performed by selecting only one third of the wirings. In such a manner, the semiconductor device can rapidly perform each of the light reception operations for obtaining object data corresponding to each of the hues.

Next, an operation of reading object data corresponding to each hue from each photosensor will be described with reference to the timing chart in FIG. 12. The timing chart in FIG. 12 illustrates the operation performed after the operation shown in FIG. 9 ends.

As illustrated in FIG. 12, the selection operation is sequentially performed in the photosensors 301R on a sensor sub-row basis, the selection operation is sequentially performed in the photosensors 301G on a sensor sub-row basis, and the selection operation is sequentially performed in the photosensors 301B on a sensor sub-row basis.

Thus, a color image corresponding to the object can be obtained.

Note that the selection operation in the photosensors can be performed regardless of the state (a light-emitting state or a non-light-emitting state) of the light-emitting elements included in the semiconductor device. As a result, the selection operation can be performed in the photosensors while the semiconductor device displays images. Therefore, image display is not much affected even if a period necessary to perform the selection operation in all of a plurality of photosensors is long.

When the driving method illustrated in FIG. 9 and FIG. 12 is employed, a plurality of photosensors included in the semiconductor device have different lengths of the period after the end of the reset operation and the storage operation and before the start of the selection operation (i.e., the charge retention period). If leakage is large in elements included in the photosensor, as the charge retention period is longer, noise included in obtained data is increased and it becomes more difficult to obtain object data correctly in a plurality of photosensors. Here, when a transistor is used as an element included in the photosensor and the transistor is in particular a transistor whose channel is formed in an oxide semiconductor layer, leakage due to the off-state current of the transistor can be reduced. Thus, the influence of noise can be reduced even if the period after the end of the reset operation and the storage operation and before the start of the selection operation (the charge retention period) is long. In the above manner, object data can be correctly obtained by employing the driving method shown in FIG. 9 and FIG. 12.

As described above, a color image corresponding to an object can be obtained with less influence on normal image display.

Note that as a more specific embodiment of the method for driving display elements, which is described using the timing chart in FIG. 9, the driving method similar to that described in Embodiment 2 can be employed.

This embodiment can be combined as appropriate with any of the other embodiments.

Embodiment 4

In this embodiment, one embodiment of the structure of a transistor that can be used in the semiconductor device of the present invention will be described.

As a semiconductor layer in which a channel of the transistor is formed, a layer containing an amorphous semiconductor, a crystalline semiconductor, a polycrystalline semiconductor, or a single crystal semiconductor, for example, can be used. For instance, a semiconductor layer containing a semiconductor belonging to Group 14 of the periodic table (e.g., silicon) can be used.

An oxide semiconductor layer can also be used as the semiconductor layer in which the channel of the transistor is formed.

As the oxide semiconductor used for the semiconductor layer, it is possible to use any of the following oxides: indium oxide; tin oxide; zinc oxide; oxides of two metal elements, such as an In—Zn-based oxide, a Sn—Zn-based oxide, an Al—Zn-based oxide, a Zn—Mg-based oxide, a Sn—Mg-based oxide, an In—Mg-based oxide, and an In—Ga-based oxide; oxides of three metal elements, such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, and an In—Lu—Zn-based oxide; and oxides of four metal elements, such as an In—Sn—Ga—Zn-based oxide, an In—Hf—Ga—Zn-based oxide, an In—Al—Ga—

Zn-based oxide, an In—Sn—Al—Zn-based oxide, an In—Sn—Hf—Zn-based oxide, and an In—Hf—Al—Zn-based oxide.

Note that here, for example, an In—Ga—Zn-based oxide means an oxide containing In, Ga, and Zn as its main components, and there is no particular limitation on the ratio of In, Ga, and Zn. The In—Ga—Zn-based oxide may contain a metal element other than In, Ga, and Zn.

Alternatively, a material represented by $InMO_3(ZnO)_m$ (m is larger than 0 and is not an integer) may be used as the oxide semiconductor. Note that M represents one or more metal elements selected from Ga, Fe, Mn, and Co. Alternatively, a material expressed by $In_3SnO_5(ZnO)_n$ (n is larger than 0 and is an integer) may be used as the oxide semiconductor.

The oxide semiconductor layer may be either single crystal or non-single-crystal. In the latter case, the oxide semiconductor layer may be either amorphous or polycrystalline. Further, the oxide semiconductor layer may have either an amorphous structure including a portion having crystallinity or a non-amorphous structure.

The oxide semiconductor layer is preferably formed by sputtering. For example, the oxide semiconductor layer can be formed by sputtering with the use of a target of any of the above oxides.

When the purity of the target is set to 99.99% or higher, alkali metal, hydrogen atoms, hydrogen molecules, water, hydroxyl groups, hydride, or the like mixed into the oxide semiconductor layer can be reduced. In addition, by using such a target, the concentration of alkali metal such as lithium (Li), sodium (Na), or potassium (K) can be reduced in the oxide semiconductor layer.

When the pressure of a treatment chamber in a sputtering apparatus is set to 0.4 Pa or less at the formation of the oxide semiconductor layer, entry of impurities such as alkali metal or hydrogen into a surface where a film is deposited and the film to be deposited can be suppressed. Note that hydrogen may be contained in the film to be deposited as a hydrogen molecule, water, a hydroxyl group, or hydride in some cases in addition to a hydrogen atom.

Further, with the use of an entrapment vacuum pump (e.g., a cryopump) as an evacuation system of the chamber of the sputtering apparatus, counter flow of impurities such as alkali metal, hydrogen atoms, hydrogen molecules, water, hydroxyl groups, or hydride from the evacuation system can be reduced. The evacuation unit may be a turbo pump provided with a cold trap.

After the oxide semiconductor layer is formed, if necessary, heat treatment may be performed at a temperature ranging from 200° C. to 450° C. in an atmosphere that hardly contains hydrogen and moisture (e.g., a nitrogen atmosphere, an oxygen atmosphere, or a dry-air atmosphere (as for moisture, a dew point is −40° C. or lower, preferably −60° C. or lower, for example)). This heat treatment can be called dehydration or dehydrogenation by which H, OH, or the like is eliminated from the oxide semiconductor layer. The heat treatment can also be called treatment for supplying oxygen when the temperature is raised in an inert atmosphere and the atmosphere is switched to an atmosphere containing oxygen during the heat treatment, or when an oxygen atmosphere is employed.

As the oxide semiconductor layer, an oxide semiconductor layer that is highly purified by reduction of impurities such as moisture, hydrogen, and alkali metal elements (e.g., Na or Li), which serve as electron donors (donors), is used. The hydrogen concentration of the highly purified oxide semiconductor layer, which is measured by secondary ion mass spectrometry (SIMS), is less than or equal to $5\times10^{19}/cm^3$, preferably less than or equal to $5\times10^{18}/cm^3$, further preferably less than or equal to $5\times10^{17}/cm^3$, still more preferably less than or equal to $1\times10^{16}/cm^3$. In addition, the carrier density of the oxide semiconductor layer, which is measured by Hall effect measurement, is lower than $1\times10^{14}/cm^3$, preferably lower than $1\times10^{12}/cm^3$, further preferably lower than $1\times10^{11}/cm^3$. Furthermore, the band gap of the oxide semiconductor is 2 eV or more, preferably 2.5 eV or more, further preferably 3 eV or more.

Note that it has been pointed out that an oxide semiconductor is insensitive to impurities, there is no problem when a considerable amount of metal impurities is contained in the film, and therefore, soda-lime glass which contains a large amount of alkali metal such as sodium and is inexpensive can also be used (Kamiya, Nomura, and Hosono, "Engineering application of solid state physics: Carrier transport properties and electronic structures of amorphous oxide semiconductors: the present status", KOTAI BUTSURI (SOLID STATE PHYSICS), 2009, Vol. 44, pp. 621-633). Such consideration, however, is not appropriate. Alkali metal is not an element included in an oxide semiconductor and is therefore an impurity. Alkaline earth metal is also an impurity in the case where alkaline earth metal is not a constituent element of an oxide semiconductor. Specifically, when an insulating film in contact with the oxide semiconductor layer is an oxide, Na, among the alkali metals, diffuses into the insulating film and becomes $Na^+$. Further, in the oxide semiconductor layer, Na cuts or enters a bond between metal and oxygen included in the oxide semiconductor, which causes deterioration of transistor characteristics (e.g., normally-on state of the transistor due to a negative shift of the threshold voltage or the decrease in mobility) and variations in the characteristics. Such deterioration of characteristics and variations in the characteristics of the transistor due to the impurity are significant especially in the case where the hydrogen concentration of the oxide semiconductor layer is extremely low. Therefore, the concentration of the above impurity is preferably reduced when the hydrogen concentration of the oxide semiconductor layer is $1\times10^{18}/cm^3$ or lower, preferably $1\times10^{17}/cm^3$ or lower. Specifically, the measurement value of the Na concentration by secondary ion mass spectrometry is preferably $5\times10^{16}/cm^3$ or lower, further preferably $1\times10^{16}/cm^3$ or lower, still more preferably $1\times10^{15}/cm^3$ or lower. Similarly, the measurement value of the Li concentration is preferably $5\times10^{15}/cm^3$ or lower, further preferably $1\times10^{15}/cm^3$ or lower. Similarly, the measurement value of the K concentration is preferably $5\times10^{15}/cm^3$ or lower, further preferably $1\times10^{15}/cm^3$ or lower.

It is known that it is difficult to accurately obtain data in the proximity of a surface of a sample or in the proximity of an interface between stacked layers formed using different materials in principle when the concentrations of alkali metal elements and hydrogen in the layer are measured with SIMS. Thus, in the case where distributions of the concentrations of alkali metal elements and hydrogen in the layer in the thickness direction are analyzed by SIMS, average values in a region of the layer where the value is not greatly changed and almost the same value can be obtained are employed as the concentrations of alkali metal elements and hydrogen. Further, in the case where the thickness of the layer is small, a region where almost the same value can be obtained cannot be found in some cases because of the influence of the concentrations of alkali metal elements and hydrogen of adjacent layers. In that case, the maximum value or the minimum value of the concentrations of alkali metal elements and hydrogen of a region where the layer is provided is employed as the concentrations of alkali metal elements and hydrogen of the layer. Furthermore, in the case where a mountain-shaped peak having the maximum value and a valley-shaped peak having the minimum value do not exist in the region where the layer is provided, the value of the inflection point is employed as the concentrations of alkali metal elements and hydrogen.

The off-state current density of the transistor whose channel is formed in the oxide semiconductor layer can be less than or equal to 100 yA/μm, preferably less than or equal to 10 yA/μm, further preferably less than or equal to 1 yA/μm.

The off-state current of the transistor whose channel is formed in the oxide semiconductor layer may be reduced by doping the oxide semiconductor layer with an impurity imparting p-type conductivity, such as Sn, so that the oxide semiconductor layer has weak p-type conductivity.

Note that the transistor may include a gate only on the upper side of the semiconductor layer in which the channel is formed, or only the lower side of the semiconductor layer. Alternatively, the transistor may include a pair of gates between which the semiconductor layer in which the channel is formed is sandwiched, in which case one of the gates can be supplied with a signal for controlling switching of the transistor and the other of the gates can be supplied with a potential. In that case, potentials with the same level may be applied to the pair of gates, or a fixed potential such as a ground potential may be applied only to the other of the gates. By controlling the level of the potential applied to the other of the gates, the threshold voltage of the transistor can be controlled. Note that the other of the gates may be in a floating state, which is an electrically insulated state, as long as the threshold voltage of the transistor is not adversely affected.

This embodiment can be combined as appropriate with any of the other embodiments.

EXAMPLE 1

The method for driving a semiconductor device, according to one embodiment of the present invention, has a feature in that a color image corresponding to an object can be obtained with less influence on normal image display.

The semiconductor device employing the driving method according to one embodiment of the present invention can be used for display devices, laptops, and image reproducing devices provided with recording media (typically, devices that reproduce the content of recording media such as digital versatile discs (DVDs) and have displays for displaying the reproduced images). Other examples of electronic devices that can include the semiconductor device employing the driving method according to one embodiment of the present invention are mobile phones, portable game machines, personal digital assistants, e-book readers, video cameras, digital still cameras, goggle-type displays (head mounted displays), navigation systems, audio reproducing devices (e.g., car audio systems and digital audio players), copiers, facsimiles, printers, multifunction printers, automated teller machines (ATM), and vending machines.

This example can be combined as appropriate with any of the above embodiments.

This application is based on Japanese Patent Application serial No. 2010-285814 filed with Japan Patent Office on Dec. 22, 2010, the entire contents of which are hereby incorporated by reference.

What is claimed is:

1. A method for driving a semiconductor device comprising:
   a first gate line;
   a second gate line;
   a source line;
   a first display element electrically connected to the first gate line and the source line;
   a second display element electrically connected to the second gate line and the source line;
   a first photosensor; and
   a second photosensor,
   the method comprising the steps of:
      supplying a first voltage to the first gate line, the first voltage to the second gate line, and first data to the source line to emit no light from a first light-emitting element and a second light-emitting element in a first period;
      supplying the first voltage to the first gate line and second data to the source line to emit light of a first hue from the first light-emitting element in a second period after the first period;
      supplying the first voltage to the first gate line and third data to the source line to emit no light from the first light-emitting element in a third period after the second period;
      supplying the first voltage to the second gate line and fourth data to the source line to emit light of a second hue from the second light-emitting element in a fourth period after the third period;
      performing a first storage operation of the first photosensor while the first photosensor receives light of the first hue in the second period; and
      performing a second storage operation of the second photosensor while the second photosensor receives light of the second hue in the fourth period, wherein the first hue and the second hue are different from each other.

2. The method for driving the semiconductor device according to claim 1,
   wherein the first display element comprises the first light-emitting element, and
   wherein the second display element comprises the second light-emitting element.

3. The method for driving the semiconductor device according to claim 1, further comprising a power supply line electrically connected to the first display element and the second display element.

4. The method for driving the semiconductor device according to claim 1, wherein the first display element, the second display element, the first photosensor, and the second photosensor are formed on a substrate.

5. The method for driving the semiconductor device according to claim 1, further comprising the step of:
   supplying a second voltage to the first gate line to emit no light from the first light-emitting element in the fourth period.

6. The method for driving the semiconductor device according to claim 5, further comprising the step of:
   supplying the second voltage to the second gate line to emit no light from the second light-emitting element in the second period.

7. A method for driving a semiconductor device comprising:
   a first gate line;
   a second gate line;
   a first source line;
   a second source line;
   a first display element electrically connected to the first gate line and the first source line;
   a second display element electrically connected to the second gate line and the first source line;

a third display element electrically connected to the first gate line and the second source line;
a fourth display element electrically connected to the second gate line and the second source line;
a first photosensor; and
a second photosensor,
the method comprising the steps of:
supplying a first voltage to the first gate line, the first voltage to the second gate line, first data to the first source line, and second data to the second source line to emit no light from a first light-emitting element, a second light-emitting element, a third light-emitting element, and a fourth light-emitting element in a first period;
supplying the first voltage to the first gate line, third data to the first source line, and fourth data to the second source line to emit light of a first hue from the first light-emitting element and emit light of the first hue from the third light-emitting element in a second period after the first period;
supplying the first voltage to the first gate line, fifth data to the first source line, and sixth data to the second source line to emit no light from the first light-emitting element and emit no light from the third light-emitting element in a third period after the second period;
supplying the first voltage to the second gate line, seventh data to the first source line, and eighth data to the second source line to emit light of a second hue from the second light-emitting element and emit light of the second hue from the fourth light-emitting element in a fourth period after the third period;
performing a first storage operation of the first photosensor while the first photosensor receives light of the first hue in the second period; and
performing a second storage operation of the second photosensor while the second photosensor receives light of the second hue in the fourth period, wherein the first hue and the second hue are different from each other.

8. The method for driving the semiconductor device according to claim 7,
wherein the first display element comprises the first light-emitting element,
wherein the second display element comprises the second light-emitting element,
wherein the third display element comprises the third light-emitting element, and
wherein the fourth display element comprises the fourth light-emitting element.

9. The method for driving the semiconductor device according to claim 7, further comprising a first power supply line electrically connected to the first display element and the second display element; and a second power supply line electrically connected to the third display element and the fourth display element.

10. The method for driving the semiconductor device according to claim 7, wherein the first display element, the second display element, the third display element, the fourth display element, the first photosensor, and the second photosensor are formed on a substrate.

11. The method for driving the semiconductor device according to claim 7, further comprising the step of:
supplying a second voltage to the first gate line to emit no light from the first light-emitting element and the third light-emitting element in the fourth period.

12. The method for driving the semiconductor device according to claim 11, further comprising the steps of:
supplying the second voltage to the second gate line to emit no light from the second light-emitting element and the fourth light-emitting element in the second period, and
supplying the first voltage to the second gate line to emit light of the second hue from the second light-emitting element and emit light of the second hue from the fourth light-emitting element in the fourth period.

13. A semiconductor device comprising:
a first gate line;
a second gate line;
a source line;
a first display element electrically connected to the first gate line and the source line;
a second display element electrically connected to the second gate line and the source line;
a first photosensor; and
a second photosensor,
wherein the first display element comprises a first light-emitting element,
wherein the second display element comprises a second light-emitting element,
wherein the first light-emitting element is configured to emit no light by supplying a first voltage to the first gate line and first data to the source line in a first period,
wherein the second light-emitting element is configured to emit no light by supplying the first voltage to the second gate line and the first data to the source line in the first period,
wherein the first light-emitting element is configured to emit light of a first hue by supplying the first voltage to the first gate line and second data to the source line in a second period after the first period,
wherein the first light-emitting element is configured to emit no light by supplying the first voltage to the first gate line and third data to the source line in a third period after the second period,
wherein the second light-emitting element is configured to emit light of a second hue by supplying the first voltage to the second gate line and fourth data to the source line in a fourth period after the third period,
wherein the first photosensor is configured to perform a first storage operation while receiving light of the first hue in the second period,
wherein the second photosensor is configured to perform a second storage operation while receiving light of the second hue in the fourth period, and
wherein the first hue and the second hue are different from each other.

14. The semiconductor device according to claim 13,
wherein the first display element comprises the first light-emitting element, and
wherein the second display element comprises the second light-emitting element.

15. The semiconductor device according to claim 13, further comprising a power supply line electrically connected to the first display element and the second display element.

16. The semiconductor device according to claim 13, wherein the first display element, the second display element, the first photosensor, and the second photosensor are formed on a substrate.

17. The semiconductor device according to claim 13, wherein at least one of the first photosensor and the second photosensor comprises a transistor comprising an oxide semiconductor.

* * * * *